US011125909B2

(12) United States Patent
Farhadiroushan et al.

(10) Patent No.: US 11,125,909 B2
(45) Date of Patent: Sep. 21, 2021

(54) ENHANCED SEISMIC SURVEYING

(71) Applicants: Silixa Ltd., Elstree (GB); Chevron U.S.A. Inc., San Ramon, CA (US)

(72) Inventors: Mahmoud Farhadiroushan, London (GB); Tom Parker, Elstree (GB); Daniel Finfer, Hertfordshire (GB)

(73) Assignees: Silixa Ltd., Elstree (GB); Chevron U.S.A. Inc., San Ramon, CA (US)

( * ) Notice: Subject to any disclaimer, the term of this patent is extended or adjusted under 35 U.S.C. 154(b) by 85 days.

(21) Appl. No.: 15/943,197

(22) Filed: Apr. 2, 2018

(65) Prior Publication Data
US 2018/0224572 A1    Aug. 9, 2018

Related U.S. Application Data

(63) Continuation of application No. 14/070,802, filed on Nov. 4, 2013, now abandoned.

(30) Foreign Application Priority Data

Nov. 2, 2012    (GB) ...................................... 1219797
Nov. 5, 2012    (GB) ...................................... 1219852

(51) Int. Cl.
  *G01V 11/00*    (2006.01)
  *G01V 1/22*    (2006.01)
  (Continued)

(52) U.S. Cl.
  CPC ............ *G01V 11/00* (2013.01); *E21B 47/135* (2020.05); *G01V 1/226* (2013.01); *G01V 1/40* (2013.01);
  (Continued)

(58) Field of Classification Search
  CPC ..... E21B 47/123; E21B 47/135; G01V 1/226; G01V 1/40; G01V 2210/6161
  See application file for complete search history.

(56) References Cited

U.S. PATENT DOCUMENTS 3,848,460  A        11/1974  Bantz et al.
4,562,540  A   *  12/1985  Devaney ............... G06T 11/006
                                                                    700/90
(Continued)

FOREIGN PATENT DOCUMENTS

WO    WO 2012/064610 A2  *  5/2012
WO       2013/045941 A1      4/2013

OTHER PUBLICATIONS

Tkachenko, "Flash-photolysis," 2006, Optical Spectroscopy (Year: 2006).*

(Continued)

*Primary Examiner* — John Fitzgerald
(74) *Attorney, Agent, or Firm* — Osha Bergman Watanabe & Burton LLP

(57) ABSTRACT

Embodiments of the present invention help in the processing and interpretation of seismic survey data, by correlating or otherwise comparing or associating seismic data obtained from a seismic survey with flow information obtained from a well or borehole in the surveyed area. In particular, embodiments of the present invention allow for flow data representing a flow profile along a well that is being monitored by a distributed acoustic sensor to be determined, such that regions of higher flow in the well can be determined. For example, in the production zone the well will be perforated to allow oil to enter the well, but it has not previously been possible to determine accurately where in the production zone the oil is entering the well. However, by determining a flow rate profile along the well using the DAS then this provides information as to where in the perforated production zone oil is entering the well, and hence the location of oil bearing sands. This location can then be combined or otherwise correlated, used, or associated with petroleum reservoir location information obtained from the seismic
(Continued)

survey, to improve the confidence and/or accuracy in the determined petroleum reservoir location.

8 Claims, 18 Drawing Sheets

(51) Int. Cl.
*E21B 47/135* (2012.01)
*G01V 1/40* (2006.01)
(52) U.S. Cl.
CPC ........... *G01V 2210/1429* (2013.01); *G01V 2210/6161* (2013.01); *G01V 2210/644* (2013.01)

(56) References Cited

U.S. PATENT DOCUMENTS

| | | | | |
|---|---|---|---|---|
| 4,648,039 | A * | 3/1987 | Devaney | G01V 1/286 367/47 |
| 4,698,793 | A * | 10/1987 | Wu | G01V 1/48 367/28 |
| 4,870,580 | A * | 9/1989 | Lang | G01V 1/284 702/17 |
| 5,204,673 | A * | 4/1993 | Kyle | G01V 1/52 175/40 |
| 5,274,495 | A * | 12/1993 | Shirasaki | G02F 1/395 359/330 |
| 5,406,530 | A * | 4/1995 | Yamamoto | G01V 1/42 181/102 |
| 5,519,637 | A * | 5/1996 | Mathur | G01H 1/00 700/280 |
| 5,579,283 | A | 11/1996 | Owens et al. | |
| 5,757,487 | A * | 5/1998 | Kersey | G01D 5/35383 356/478 |
| 6,131,694 | A * | 10/2000 | Robbins | G01V 1/282 181/105 |
| 6,255,962 | B1 * | 7/2001 | Tanenhaus | G08C 15/00 246/169 R |
| 6,268,911 | B1 * | 7/2001 | Tubel | E21B 23/03 356/72 |
| 6,282,332 | B1 * | 8/2001 | Bosso | G02B 6/1342 359/305 |
| 6,308,137 | B1 * | 10/2001 | Underhill | E21B 43/14 702/9 |
| 6,354,147 | B1 | 3/2002 | Gysling et al. | |
| 6,435,030 | B1 | 8/2002 | Gysling et al. | |
| 6,450,037 | B1 | 9/2002 | McGuinn et al. | |
| 6,456,566 | B1 * | 9/2002 | Aronstam | G01V 1/40 367/86 |
| 6,550,342 | B2 | 4/2003 | Croteau et al. | |
| 6,588,266 | B2 * | 7/2003 | Tubel | E21B 23/03 73/152.39 |
| 6,601,458 | B1 * | 8/2003 | Gysling | G01F 1/74 73/861.04 |
| 6,767,467 | B2 * | 7/2004 | Fischer | G01N 30/82 210/143 |
| 6,785,004 | B2 | 8/2004 | Kersey et al. | |
| 6,888,972 | B2 * | 5/2005 | Berg | G01V 11/00 385/12 |
| 6,913,079 | B2 * | 7/2005 | Tubel | E21B 47/00 114/382 |
| 6,945,095 | B2 * | 9/2005 | Johansen | E21B 47/10 73/61.45 |
| 6,971,259 | B2 * | 12/2005 | Gysling | G01N 9/002 73/24.05 |
| 7,124,818 | B2 * | 10/2006 | Berg | E21B 17/1021 166/250.01 |
| 7,197,942 | B2 * | 4/2007 | Gysling | G01F 1/7082 73/861.23 |
| 7,249,525 | B1 | 7/2007 | Engel | |
| 7,263,874 | B2 | 9/2007 | Fitch et al. | |
| 7,281,415 | B2 * | 10/2007 | Johansen | E21B 47/10 73/61.45 |
| 7,548,319 | B2 * | 6/2009 | Hartog | G01D 5/35383 356/35.5 |
| 7,571,633 | B2 * | 8/2009 | Gysling | G01F 1/7082 73/19.03 |
| 7,587,948 | B2 | 9/2009 | Gysling et al. | |
| 7,596,987 | B2 | 10/2009 | Gysling et al. | |
| 7,604,054 | B2 | 10/2009 | Hocking | |
| 7,946,341 | B2 * | 5/2011 | Hartog | E21B 43/26 166/254.1 |
| 8,584,519 | B2 * | 11/2013 | Maida | E21B 47/16 73/152.54 |
| 8,789,587 | B2 * | 7/2014 | Tubel | E21B 23/03 166/250.15 |
| 8,805,632 | B2 * | 8/2014 | Coman | G01V 11/002 702/89 |
| 8,879,356 | B1 * | 11/2014 | Ray | G01V 1/223 367/76 |
| 8,899,322 | B2 * | 12/2014 | Cresswell | E21B 47/04 166/255.1 |
| 9,109,944 | B2 * | 8/2015 | Den Boer | G01H 9/004 |
| 9,617,848 | B2 * | 4/2017 | Hill | G01V 1/50 |
| 9,896,929 | B2 * | 2/2018 | Farhadiroushan | G01P 5/241 |
| 10,927,667 | B2 * | 2/2021 | Farhadiroushan | G01F 1/7086 |
| 2003/0094281 | A1 * | 5/2003 | Tubel | E21B 47/00 166/250.03 |
| 2003/0117893 | A1 * | 6/2003 | Bary | G01V 1/3852 367/16 |
| 2006/0023567 | A1 * | 2/2006 | Uhl | G01V 1/008 367/13 |
| 2006/0146337 | A1 * | 7/2006 | Hartog | G01D 5/35383 356/478 |
| 2006/0212226 | A1 * | 9/2006 | Ray | G01V 1/226 702/14 |
| 2006/0256651 | A1 * | 11/2006 | Sanders | G01V 1/02 367/15 |
| 2008/0205191 | A1 * | 8/2008 | Coste | G01V 1/42 367/15 |
| 2009/0012711 | A1 * | 1/2009 | Harmon | G01V 1/42 702/9 |
| 2009/0072964 | A1 * | 3/2009 | Muralidharan | G08B 13/1663 340/539.3 |
| 2009/0114386 | A1 * | 5/2009 | Hartog | E21B 43/26 166/250.08 |
| 2009/0190850 | A1 * | 7/2009 | Tang | G01V 11/00 382/251 |
| 2010/0097890 | A1 * | 4/2010 | Sullivan | E21B 17/028 367/82 |
| 2010/0107754 | A1 * | 5/2010 | Hartog | E21B 47/101 73/152.47 |
| 2010/0128454 | A1 * | 5/2010 | Koste | G02B 6/428 361/818 |
| 2010/0207019 | A1 * | 8/2010 | Hartog | E21B 47/101 250/269.1 |
| 2011/0088462 | A1 | 4/2011 | Samson et al. | |
| 2011/0188344 | A1 * | 8/2011 | Hartog | E21B 43/26 367/27 |
| 2011/0271769 | A1 * | 11/2011 | Kippersund | G01F 1/42 73/861.28 |
| 2011/0280103 | A1 * | 11/2011 | Bostick, III | E21B 47/101 367/35 |
| 2012/0046866 | A1 * | 2/2012 | Meyer | E21B 28/00 702/6 |
| 2012/0057432 | A1 * | 3/2012 | Hill | E21B 43/11857 367/81 |
| 2012/0092960 | A1 * | 4/2012 | Gaston | E21B 47/101 367/35 |
| 2012/0111560 | A1 * | 5/2012 | Hill | E21B 47/123 166/250.1 |
| 2012/0152024 | A1 | 6/2012 | Johansen | |
| 2012/0162639 | A1 * | 6/2012 | Farhadiroushan | G01D 5/35383 356/73.1 |
| 2012/0255362 | A1 * | 10/2012 | Den Boer | G01H 9/004 73/655 |

(56) References Cited

U.S. PATENT DOCUMENTS

| | | | |
|---|---|---|---|
| 2012/0277995 A1* | 11/2012 | Hartog | E21B 43/26 702/8 |
| 2012/0287749 A1 | 11/2012 | Kutlik et al. | |
| 2012/0297883 A1 | 11/2012 | Kupershmidt | |
| 2013/0242698 A1* | 9/2013 | Mcewen-King | G01V 1/20 367/37 |
| 2013/0301389 A1* | 11/2013 | Alford | G01V 1/40 367/81 |
| 2013/0336612 A1* | 12/2013 | Pearce | E21B 47/011 385/12 |
| 2014/0020453 A1* | 1/2014 | Estrada | G01N 33/2847 73/61.46 |
| 2014/0064742 A1* | 3/2014 | Barfoot | G01V 1/26 398/154 |
| 2014/0069207 A1* | 3/2014 | Leaders | G01F 1/667 73/861.28 |
| 2014/0126325 A1 | 5/2014 | Farhadiroushan et al. | |
| 2014/0126331 A1* | 5/2014 | Skinner | G01V 1/40 367/82 |
| 2014/0180592 A1* | 6/2014 | Ravi | E21B 47/101 702/12 |
| 2014/0216151 A1* | 8/2014 | Godfrey | E21B 47/10 73/152.32 |
| 2014/0290936 A1* | 10/2014 | Wills | E21B 43/26 166/250.1 |
| 2015/0013446 A1* | 1/2015 | Godfrey | E21B 47/10 73/152.32 |
| 2015/0146759 A1* | 5/2015 | Johnston | E21B 47/065 374/117 |
| 2015/0285064 A1* | 10/2015 | Farhadiroushan | G01P 5/241 73/655 |
| 2016/0169712 A1* | 6/2016 | Farhadiroushan | G01D 5/35383 73/655 |
| 2017/0016312 A1 | 1/2017 | Clarke et al. | |
| 2017/0082484 A1* | 3/2017 | Farhadiroushan | G01D 5/35335 |
| 2017/0176621 A1* | 6/2017 | Valero | E21B 47/14 |
| 2018/0031718 A1* | 2/2018 | Freitas | G01V 1/22 |
| 2018/0149017 A1* | 5/2018 | Farhadiroushan | G01N 29/46 |
| 2018/0224572 A1 | 8/2018 | Farhadiroushan et al. | |
| 2018/0231498 A1* | 8/2018 | Amir | G01F 1/661 |
| 2019/0049617 A1* | 2/2019 | Kadayam Viswanathan | G01R 33/4641 |
| 2021/0072190 A1* | 3/2021 | Amir | G01F 1/708 |

OTHER PUBLICATIONS

Office Action issued in corresponding Australian Application No. 2013340502 dated May 3, 2017 (4 pages).

Office Action issued in corresponding Australian Application No. 2013340502 dated Sep. 19, 2017 (4 pages).

Office Action issued in corresponding GB Application No. 1909897.9 dated Jan. 16, 2020 (3 pages).

Office Action issued in corresponding U.S. Appl. No. 15/877,588 dated Mar. 13, 2020 (11 pages).

Office Action issued in corresponding U.S. Appl. No. 15/877,588 dated Oct. 31, 2019 (10 pages).

* cited by examiner

ENHANCED SEISMIC SURVEYING

CROSS-REFERENCE TO RELATED APPLICATIONS

This application is a continuation application that claims benefit under 35 U.S.C. § 120 to U.S. patent application Ser. No. 14/070,802, filed Nov. 4, 2013, which claims foreign priority to Application No. GB 1219852.9, filed Nov. 5, 2012, and Application No. GB 1219797.6, filed Nov. 2, 2012. These applications are incorporated by reference herein in their entireties.

TECHNICAL FIELD

The present invention relates to a method and system which provides for enhanced seismic surveying techniques, and in particular in some embodiments by correlating or otherwise comparing or associating seismic data obtained from a seismic survey with flow information obtained from a well or borehole in the surveyed area.

BACKGROUND TO THE INVENTION AND PRIOR ART

Seismic surveying for the exploration of hydrocarbon reserves is well known in the art, and involves the use of reflection seismology to detect and map geologic features characteristic of petroleum reservoirs. A large aspect of seismic surveying is the post-processing and interpretation that is applied to the obtained seismic data, to identify the presence of oil bearing sands underneath a trap and seal, and to map the extent and depth of a detected reservoir. Any significant development that can help with the post-processing and interpretation of seismic data to provide improved results can be very commercially valuable.

In addition, and unrelated to the above, optical fibre based distributed acoustic sensors (DAS) are known in the art. One high performance example is the iDAS, available from Silixa Limited, of Elstree, UK. Further details of the operation of a suitable DAS are given in WO2010/0136809, which also discloses that distributed acoustic sensors may be used for in-well applications, in that an acoustic noise profile can be obtained from along a well, and used to measure the flow by noise logging at every location along the well. In addition, the noise spectrum can be used to identify the phase of the fluid.

However, one problem that arises in the use of DAS for flow monitoring is in fluid carrying structures such as wells or boreholes where the flow is substantially laminar, with few eddies or other turbulent regions that cause noise. In such a case acoustic monitoring of the fluid carrying structure is unable to determine the fluid flow, or the fluid phase, due to the lack of input information into the sensor. Moreover, in fluid carrying structures where the flow is sometimes turbulent and sometimes laminar, the monitoring of such structures with a DAS can result in large amounts of data, much of which is of little use when no noise is present.

Examples of flow carrying structures that are sometimes too quiet for conventional DAS monitoring are oil wells with low flow rates, such as late-life production wells in aging fields such as the North Sea, and shale oil or shale gas wells.

SUMMARY OF THE INVENTION

Embodiments of the present invention provide a new technique to help in the processing and interpretation of seismic survey data, by correlating or otherwise comparing or associating seismic data obtained from a seismic survey with flow information obtained from a well or borehole in the surveyed area. In particular, embodiments of the present invention allow for flow data representing a flow profile along a well that is being monitored by a DAS to be determined, such that regions of higher flow in the well can be determined. For example, in the production zone the well will be perforated to allow oil to enter the well, but it has not previously been possible to determine accurately where in the production zone the oil is entering the well. However, by determining a flow rate profile along the well using the DAS then this provides information as to where in the perforated production zone oil is entering the well, and hence the location of oil bearing sands. This location can then be combined or otherwise correlated, used, or associated with petroleum reservoir location information obtained from the seismic survey, to improve the confidence and/or accuracy in the determined petroleum reservoir location.

In some embodiments, as part of determining the flow rate along the well the speed of sound along the well is found. This information itself indicates the type and/or phase of the fluid in the well, e.g. whether the fluid is oil, gas, water, brine, etc. This information can be used in enhanced oil recovery (EOR) production techniques, such as water injection, by informing when and where in the well water is being received rather than oil. Of course, the total amount of water compared to oil can be determined at the surface when the recovered material is processed, but using the DAS techniques of the present invention it is possible to know where in the well water is received compared to where oil is received. This should help inform and direct future water injection operations.

In addition, in further embodiments address the problem of quiet wells making flow detection difficult can be overcome by making use of a physical effect observed by the present applicants that externally generated noise can be coupled into a fluid carrying structure such as a pipe, well, or borehole so as to artificially acoustically "illuminate" the pipe, well, or borehole, and allow fluid flow in the structure to be determined. In particular, in embodiments of the invention externally generated noise is coupled into the structure being monitored at the same time as data logging required to undertake the monitoring is performed. This has three effects, in that firstly the externally generated sound is coupled into the structure so as to "illuminate" acoustically the structure to allow data to be collected from which fluid flow or structural integrity may be determined, and secondly the amount of data that need be collected is reduced, as there is no need to log data when the structure is not being illuminated. Thirdly, there are signal processing advantages in having the data logging being undertaken only when the acoustic illumination occurs, in that any data averaging that needs to be performed is taken only over the (usually short) period of illumination. This can increase the signal to noise ratio considerably. Thus, in these embodiments flow profile data and/or speed of sound data for use in the above techniques can be obtained even from quiet, low flow wells.

In view of the above, from one aspect one embodiment provides a method for enhancing seismic survey results, comprising receiving seismic data from a seismic survey of an area provided with a well or borehole arranged to tap an underground reservoir. The well or borehole is monitored with a distributed acoustic sensor (DAS), and the fluid flow from the reservoir along one or more parts of the well or borehole is then determined using acoustic measurements obtained by the DAS. The determined fluid flow data may then be combined, for example by correlation, association or other use, with the seismic data to improve the confidence or accuracy of determined characteristics of the underground reservoir.

In one embodiment the characteristics include one or more of the size, depth, extent, volume, and/or pressure of the reservoir.

Moreover, in one embodiment the well or borehole may be acoustically illuminated with a controllable sound source.

Another embodiment according to another aspect provides a method for enhanced oil recovery, comprising undertaking water injection into an underground oil reservoir provided with a production well or borehole, and monitoring the production well or borehole with a distributed acoustic sensor (DAS) to determine whether oil or water is being received at one or more parts of the well.

In one embodiment of the above aspect the monitoring may comprise determining the speed of sound in received fluid at one or more parts of the well to thereby determine the type of fluid.

Moreover, in one embodiment the well or borehole may be acoustically illuminated with a controllable sound source.

Where acoustic illumination is used, this may comprise determining the generation of an acoustic wave; and at the same time as the generated acoustic wave is incident on the structure, sensing, using a distributed acoustic sensor, acoustic energy coupled into the fluid-flow carrying structure from the incident generated acoustic wave. Acoustic data corresponding to the sensed acoustic energy may then be stored, at least temporarily.

With the above, a "quiet" flow carrying structure may be deliberately illuminated by the generated acoustic wave, and acoustic data resulting from the illumination then sensed and stored for later use.

For example, in one embodiment the method calculates the speed of sound in one or more parts of the structure or in the fluid from the acoustic data. As such, embodiments of the invention may be used for both fluid phase determination, as well as structural integrity checking.

In another embodiment the stored or sensed data may be used to determine properties of fluid flow in the structure from the acoustic data. In one preferred embodiment the properties include the speed of fluid flow in the structure. As such, this embodiment may be used for fluid flow monitoring purpose.

For example, in one embodiment the method uses the stored acoustic data to calculate the speed of sound in the fluid from the acoustic data. In another embodiment the stored or sensed data may be used to calculate the speed of fluid flow in the structure from the acoustic data.

In one embodiment a processor is provided that is arranged to plot the acoustic data as a two dimensional space-time image. The processor then applies a two dimensional Fourier transform to the space-time image to obtain a transformed image. Gradients may then be identified in the transformed image, the identified gradients corresponding to the speed of sound, or at least a property or derivative thereof, of the coupled acoustic energy.

In one embodiment the identified gradients indicate the speed of sound in opposite directions along the flow carrying structure. This allows the processor to calculate the fluid flow in dependence on a difference between the respective speeds of sound in the fluid in the opposite directions.

In one embodiment the acoustic wave is generated remote from the structure, whereas in another embodiment the acoustic wave may be generated next to or within the structure.

In one embodiment the acoustic wave is generated by a seismic source, wherein preferably the seismic source is a source selected from the group comprising: airguns, vibroseis, explosives, or piezo transducers.

In another embodiment the acoustic wave is generated by an internal source to the structure. In particular the acoustic source may be a mechanism driven by the fluid flow.

The acoustic wave may take many forms, and may be for example one of a pseudo random sequence or an impulse.

In a preferred embodiment acoustic data is not stored substantially during time periods between the periods when the acoustic wave is incident on and propagating through the structure. This reduces the amount of data that is generated and stored by the DAS.

In one embodiment the generation of the acoustic wave and the sensing and storing of acoustic data are synchronised. In particular, the generation of the acoustic wave may be triggered, and then the DAS may wait for any propagation delay until the generated wave is incident on the structure before sensing the coupled acoustic energy and storing corresponding acoustic data.

In the above embodiment the DAS preferably ceases the storing of acoustic data once the acoustic wave has propagated along the structure.

In a particularly preferred embodiment the distributed acoustic sensor is an optical fibre based sensor. Moreover, preferably the structure is a pipe, well, or borehole.

In another aspect an embodiment of the present invention also provides a fluid-flow carrying structure comprising an elongate fluid carrying channel through which fluid may flow; and an acoustic transmission mechanism arranged in use to couple incident acoustic energy into the fluid flow carrying structure. In this aspect the fluid flow carrying structure may be specially adapted to allow illuminating acoustic energy incident from the outside to be coupled therein, thereby enhancing the acoustic illumination effect of the present invention.

In one embodiment the acoustic transmission mechanism comprises a drum structure having a first surface and a second surface and an acoustic connection mechanism to conduct acoustic energy incident on the first surface to the second surface. The first surface is reactive to incident acoustic waves and vibrates when such waves are incident thereon. The acoustic vibrations are passed by the acoustic connection mechanism (such as one or more linking arms or the like) to the second surface, which is arranged to radiate the acoustic energy outwards, into the structure, and thereby couple the energy into the structure.

In another embodiment the acoustic transmission mechanism comprises an acoustic transmission rod extending through at least one part of the structure for transmitting acoustic energy through the at least one part. In this case incident acoustic vibrations are passed by the rod into the structure, and thereby coupled into the structure.

In some embodiments the structure is a pipe, well, or borehole, and particularly an oil or gas well.

Further features and aspects of the invention will be apparent from the appended claims.

BRIEF DESCRIPTION OF THE DRAWINGS

Further features and advantages of the present invention will become apparent from the following description of an embodiment thereof, presented by way of example only, and by reference to the drawings, wherein like reference numerals refer to like parts, and wherein.

DESCRIPTION OF THE EMBODIMENTS

Overview of Embodiments

Embodiments of the invention relate to using a distributed acoustic sensor to determine fluid flow along a well or borehole, and then combining this information with information relating to oil reservoir location obtained from a seismic survey of the area to improve the confidence and/or accuracy of the reservoir location data. In particular, the seismic survey data may indicate, often in 3D, the location of a reservoir to within the sensing resolution of the seismic detection array. This may be in the order of 12-25 m, or more appropriately 20-200 m, depending on wavelength (cf Cartwright et. al "3D *seismic technology: the geological 'Hubble'*" Basin Research (2005) No. 17, pp. 1-20). However, the DAS can provide flow profile data with a much greater resolution, sometimes down to 1 m in the case of the Silixa iDAS™, but often around 5 m. Therefore, supplementing the seismic data with much higher resolution DAS data indicating flow rates in the well (and hence where the reservoir is producing) can help to more accurately map and characterize the location and other properties of the petroleum reservoir.

In addition, using the DAS to distinguish between material and phase of the produced fluid (e.g. oil, water, gas etc) using speed of sound measurements (which are, as will be seen below, a precursor to flow rate calculation) can help inform on the efficacy of EOR techniques such as water injection.

Finally, the success of DAS-based fluid flow measurements depends on the presence of audio frequency and sub-audio frequency noise within the flow. Quiet flows have been seen not to produce useful k-omega (k-ω) data. Ambient noise from the ground surrounding boreholes can 'creep in' to pipes to illuminate them acoustically, but naturally generated ambient levels are usually much too low to be detectable by a DAS. To solve this problem some embodiments of the invention combine a sound source in synchronization with monitoring using a DAS, so that the sound source acoustically illuminates the interior of the borehole, and allows the DAS to log data that can be used to determine the fluid flow.

There follows various sections describing how fluid flow may be determined, firstly more generally, and then in quiet wells using acoustic illumination techniques. Various techniques for improving the acoustic illumination are then described, and then embodiments of the invention relating to combining the fluid flow profile data with seismic data are described.

Determination of Fluid Flow

Figure 1:
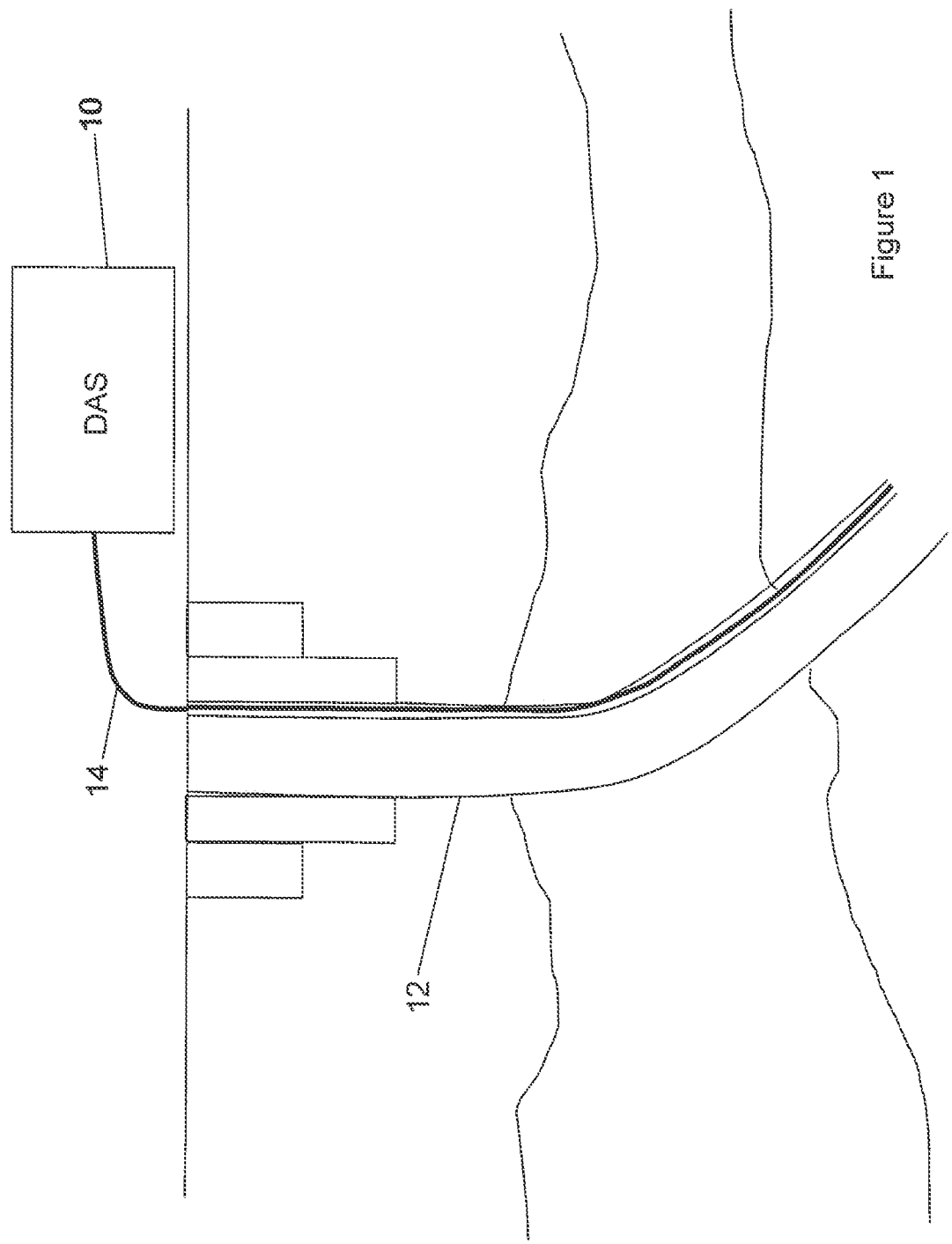
FIG. 1 is a diagram illustrating an example DAS deployment of the prior art.

FIG. 1 illustrates a typical DAS deployment in an oil well. The well 12 extends through rock strata as shown, and a fibre optic cable 14 is provided running along the length of the well, in this case substantially parallel thereto. In other embodiments the cable may extend along the well in a different manner, for example wrapped around elements of the well. In this respect, all that is important is that there is a known relationship between the different parts of the cable and the different parts of the well.

Figure 2:
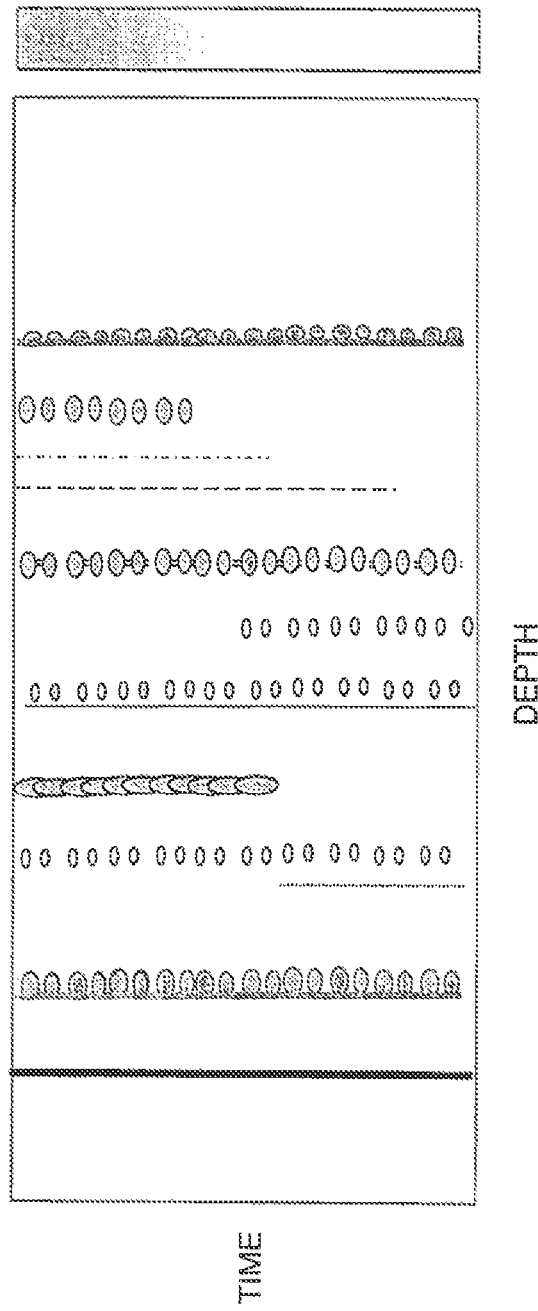
FIG. 2 is a drawing of an example space-time plot of the data collected by a DAS in a deployment like that of FIG. 1.

The fibre optic cable 14 is connected to a distributed acoustic sensor (DAS), such as the Silixa Ltd iDAS, referenced previously. The DAS is able to record sound incident on the cable at between 1 m and 5 m resolution along the whole length of the cable, at frequencies up to around 100 kHz. Hence, monitoring of the well with the DAS results in a large amount of data, that may be represented by a two dimensional space-time plot, an example of which is shown in FIG. 2. Here, the horizontal axis shows "depth", or distance along the cable, and the left hand vertical axis shows time. The right hand vertical axis shows a colour chart, with different colours representing sound of different intensity. Hence, the 2D space time plot provides a visual record of where on the cable sound was heard, and at what measurement time.

Figure 3:
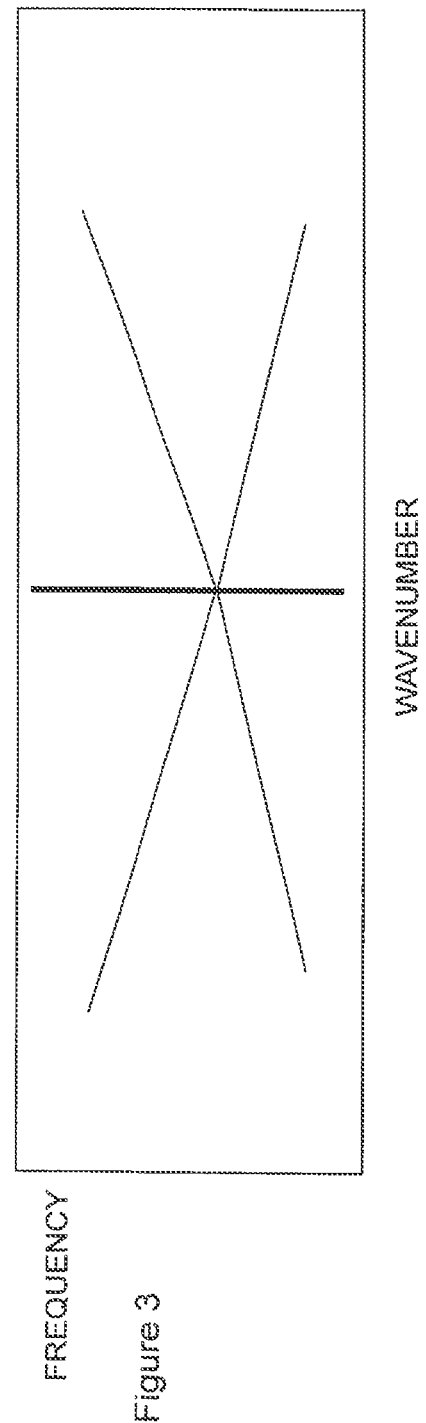
FIG. 3 is a drawing of a 2D Fourier transform (kω plot) of the space-time plot of FIG. 2.

In more detail, the DAS system can measure the phase of the acoustic signal coherently along the fibre optic cable. Therefore, it is possible to use a variety of methods to identify the presence of propagating acoustic waves. Digital signal processing can transform the time and linear space (along the well) into a diagram showing frequency (ω) and wavenumber (k) in k-ω space. A frequency independent speed of sound propagation along the well will show up as a line in k-ω space. FIG. 2 shows the time and space signal and FIG. 3 shows the corresponding k-ω space. Using the data in FIG. 3, a good fit for the speed of sound can be calculated, by determining the gradient of the diagonal lines. The frequency band over which the speed of sound can be determined is more than sufficient for compositional and flow characterization. With the DAS system the speed of sound can be evaluated over a large section of the well and, therefore, measure the distributed variations of the flow composition and characteristics along the well. The technique is particularly powerful for determining the composition of the flow—for example, gas has a speed of sound of around 600 m/s whereas water has a speed of sound around 1500 m/s.

Figure 4:
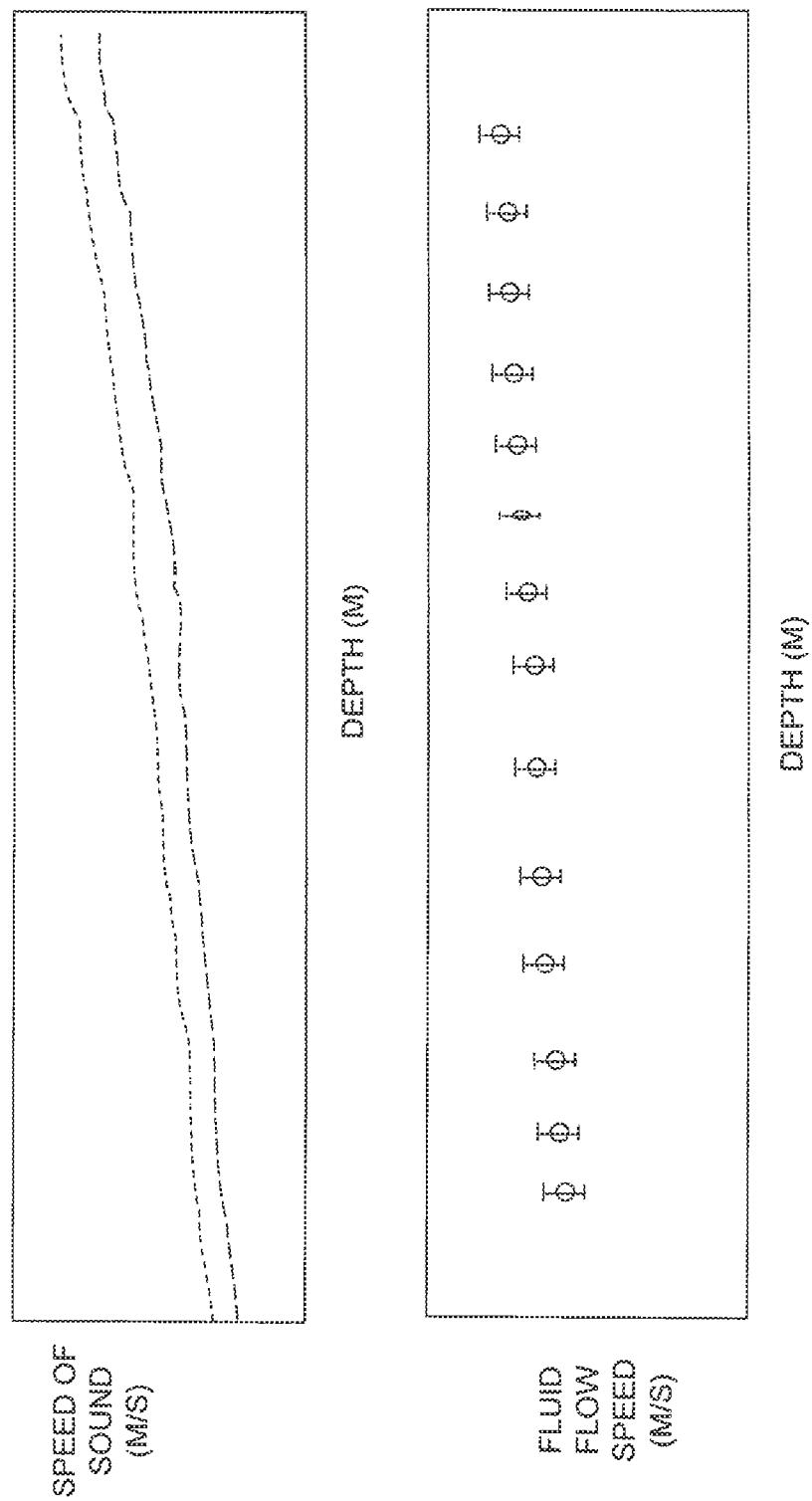
FIG. 4 is a graph showing upwards and downwards speed of sounds in a pipe, (top) together with calculated Doppler shifts (bottom) that provide fluid velocity measurements.

Using k-ω analysis the speed of sound can also be determined throughout the entire length of the well. Importantly, each of the two diagonal lines shown in the k-a space of FIG. 3 corresponds to the speed of sound either travelling up or down the well. These two lines can be analysed to reveal the Doppler-shifted sound speeds for upward and downward propagating sound within the fluid of interest. FIG. 4 shows the distributed flow determined in a gas injector based on Doppler shift measurements for a 30 s sampling. The determined flow speed varies with depth in the well corresponding to the change in hydrostatic pressure for a section of tubing with a uniform inner dimension and a gradually sloped well trajectory. In total the instantaneous and locally determined flow is roughly within +/−0.3 m/s (that for this well is 10%) of the actual flow speed. The match to reference measurements is within the uncertainties of an instantaneous measurement, the fluid property and the distribution of the pressure drop within the well.

In further detail, it is possible to estimate the speed of a given flow by monitoring the speeds of sound within that flow. In this analysis, it is assumed that the flow direction is coincident with the array layout (e.g. the direction of arrival for acoustic signals is known to be 0 or 180 degrees). The main principle used is that any sound contained within the flow reaches each consecutive sensor with a certain delay. Knowledge of the spatial sampling (i.e. the distribution of the cable along the well) can be used to calculate speed of sound by taking the ratio of average inter-sensor time difference of arrival and the average spatial distance between sensors. This operation can be easily done in the frequency domain. To perform this operation, one constructs a space-time plot of the signal across a neighbourhood of sensors. The 2D Fourier Transform of information this will give a wavenumber-frequency (k-ω) plot.

If the speed of sound is constant across all frequencies (i.e. there is no dispersion) then each frequency (ω) of a signal will correspond to a certain wavenumber (k) on the k-ω plot. Thus ideally a space-time signal will be mapped into a single straight line on the k-ω plot. From the wave equation we know that kc=w, where c is the speed of sound. So estimating the slope of the line of highest energy on the k-ω plot will give us the speed of sound in the medium.

Since the waveguide can sustain propagation both along and against the direction of flow, the k-ω plot can show two slopes for each mode of propagation: one positive and one negative. As the slope of each of these lines indicates the sound speed in each direction, the Doppler method can be used to derive the speed of sound from the 2D FFT according to the well-known method of analysis below.

$c+=c+v$ [speed of sound along the flow]

$c-=c-v$ [speed of sound against the flow]

c+ and c− are found as slopes on a k-ω plot. Combination of the two equations above gives the flow speed (Ev[1]) as v=(c+−c−)/2.

In addition, as noted above, the measured speed of sound at points along the well indicates the composition or phase of the fluid at that point, due to speed of sound differences dependent on the material. Hence, the profile of the speed of sound along the well indicates the material prevalent at each point on the profile.

Illumination Using Noise Sources

As noted above, some embodiments of the invention are directed at determining fluid flow of quiet wells, by using an acoustic source to "illuminate" the well and allow the DAS to collect data from which the fluid flow can then be found. It is therefore necessary to consider the physical mechanism of how acoustic energy can be coupled into a fluid carrying structure such as a pipe, well, or borehole.

Waveguides are systems which exhibit a very high propensity to direct energy along particular pathways. Pipes are one-dimensional acoustic waveguides, the acoustic characteristics of which have been well-analysed within the classical acoustics literature. As a result of these waveguide properties, acoustic sources external to pipes can be used to illuminate acoustically the internal volumes of those pipes even when the source of interest is external to the pipe. In one embodiment of the present invention, a source in the vicinity of the pipe, such as a vibroseis or dropped weight, will drive an acoustic signal into the ground. As the signal radiates through the ground and encounters the pipe, acoustic energy will tend to be coupled into the pipe and be redirected along the pipe primary dimension. An acoustic sensor array mounted within or along the pipe coincident with the pipe principal dimension can be used to interpret the speed of sound within the pipe volume and wall (and, if present, the outer annulus). Regardless of the relative phase of different acoustic waves as they enter the pipe, the speeds of sound in both the forward and reverse directions of propagation can be determined, and hence flow speed can be observed. One aspect is that the energy entering the pipe should preferably be below the cutoff frequency for the waveguide, else energy will not propagate as a plane wave and wave speed determination will be increased in complexity.

Potential Noise Sources

Figure 8:
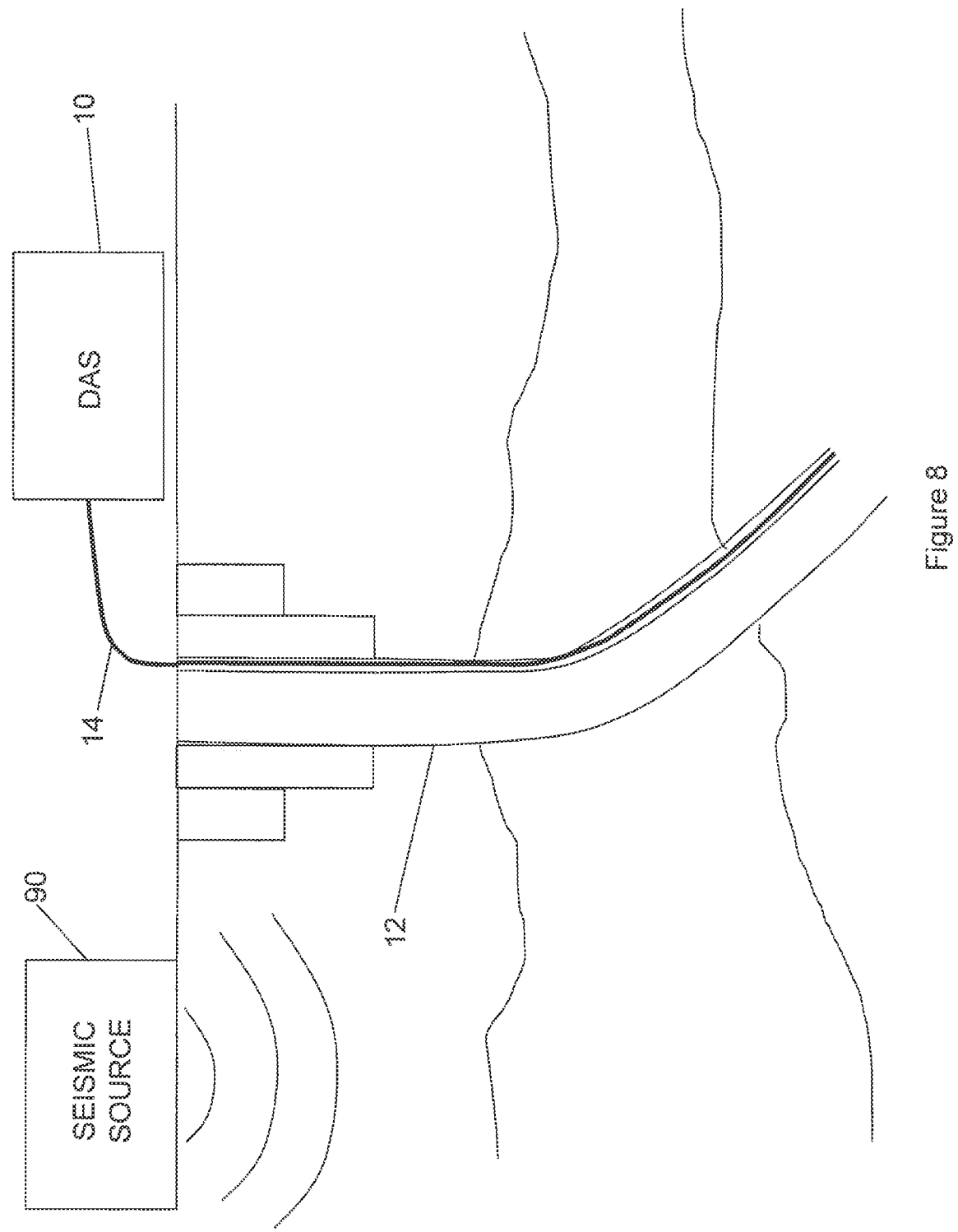
FIGS. 8 to 10 are diagrams illustrating how various noise sources may be provided in embodiments of the invention.
Figure 9:
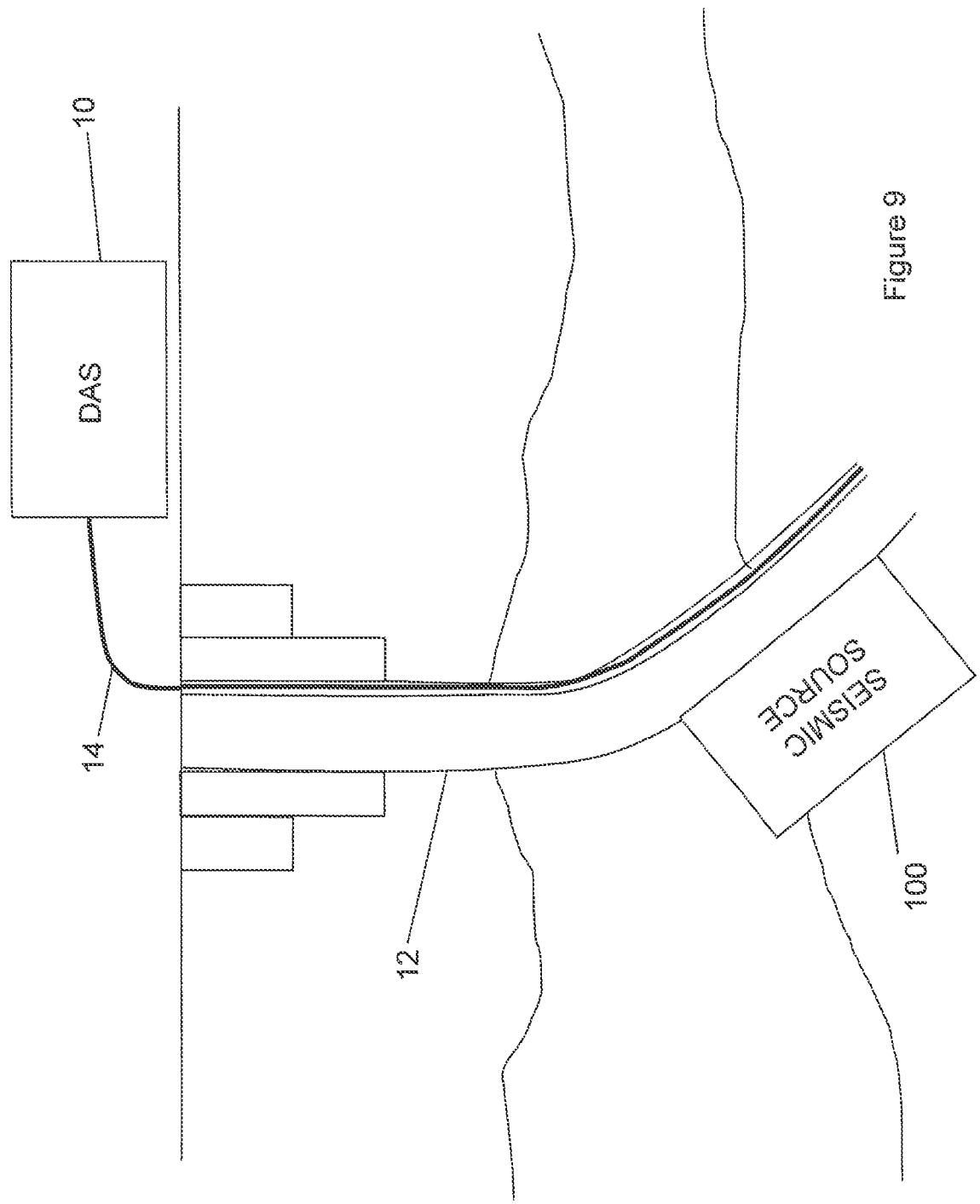
Figure 10:
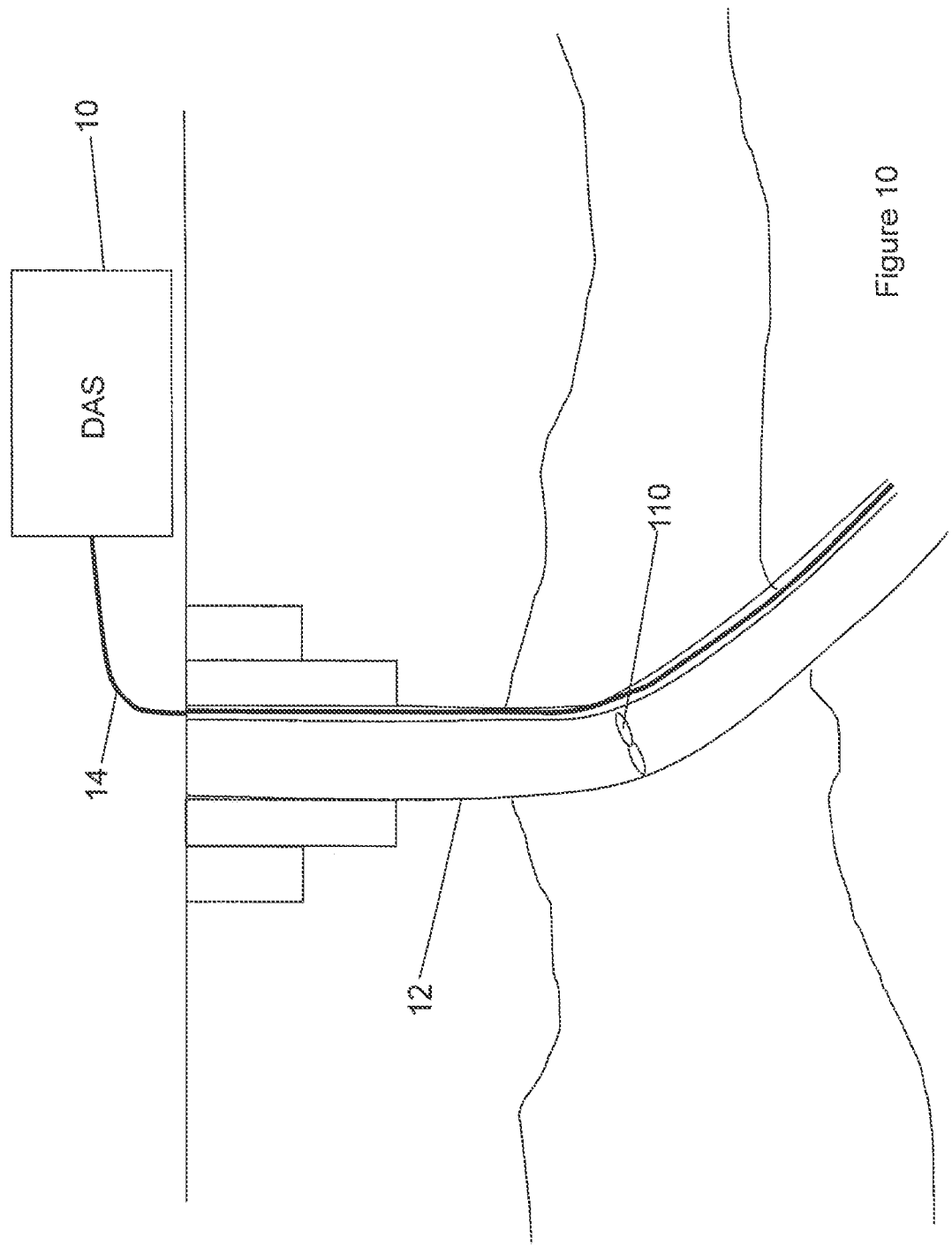

Many different noise sources may be used in embodiments of the invention which provide for acoustic illumination, as shown in FIGS. 8 to 10. For example, seismic sources such as seismic source 90 remote from the well, as shown in FIG. 8, or next to or in the well, as shown in FIG. 9, may be used. 1. Such seismic sources (90, 100) may be airguns, vibroseis, explosives, or piezo transducers either placed outside the well or in the well.

In addition, passive sources powered by the flow, for example a clapper or a spinner 110 with a clicking mechanism attached may be used, as shown in FIG. 10.

Additionally, in further embodiments active sources powered by power harvesting techniques may be used. An example is that the flow or vibrations in the well may be used to generate power which is then used to power a device (for example a pulsing piezo).

With respect to the precise noise signal that may be used, the use of random or pseudo-random vibroseis-generated signals in a zero-offset arrangement tandem with a flowing well monitored by a DAS should allow for sufficient averaging to yield useful flow data even in nearly silent wells. Noise generated within wells could also be used for this type of illumination.

In practice, this would involve bringing a vibroseis up to a well, and driving it with a pseudo-random signal for a while (may be a few minutes) while the DAS acquires data. This could also be done with other excitations (single pulses, chirps) but pseudo-random is practically and theoretically the most robust method.

Method of Operation of Acoustic Illumination

Figure 11:
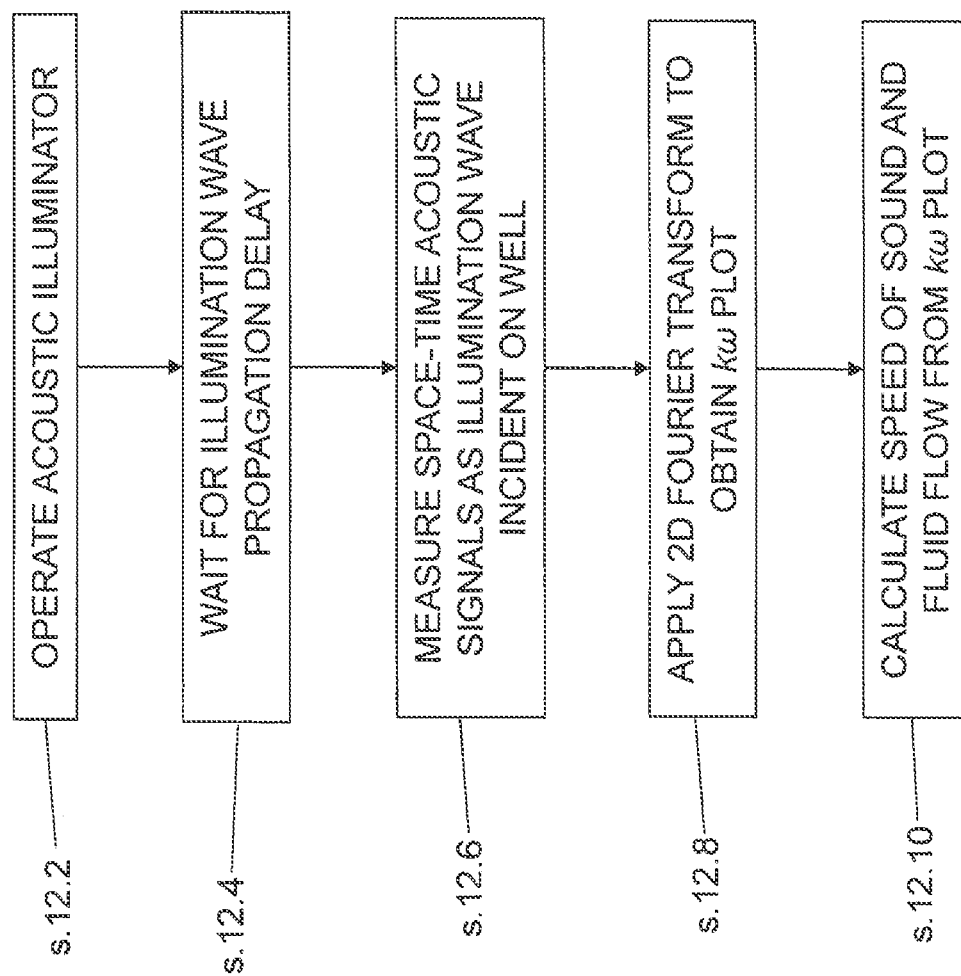
FIG. 11 is a flow diagram illustrating the sequence of operations in embodiments of the invention.

FIG. 11 illustrates the overall operation of the embodiments in FIGS. 8 to 10 where acoustic illumination is used to help obtain the fluid flow. At step 12.2 the acoustic illuminator (i.e. the sound source, whether seismic or otherwise) is operated. If the sound source is some (known) distance away then it is necessary to wait for the illumination acoustic wave to propagate to the site of the well, pipe, or borehole, as shown at step 12.4. However, if the sound source is local, then it is not necessary to wait for this propagation period.

At the same time as (or just before) the acoustic wave is incident on the well, pipe, or borehole, the DAS system 10 is activated to begin logging space-time acoustic data, at step 12.6. Thus, the DAS begins to record acoustic data representative of the incident acoustic wave being coupled into the fluid carrying structure. Once the acoustic energy has been coupled into the structure and propagated therealong, the data logging can then stop. Hence, it becomes necessary to log data for only a short period of time during the actual illumination by the acoustic source.

Once the space time data has been obtained, at steps 12.8 and 12.10 the same steps as described above to calculate the speed of sound in the flowing medium, and then the actual flow speed itself are performed. These steps may be performed substantially in real time immediately after the data has been captured, or as a post-processing step some time later.

One benefit to using active acoustic illumination in fluid flow metering in boreholes is the ability to synchronize the flow measurement with the acoustic source firing. This can greatly increase the signal to noise ratio of results by allowing averaging to be calculated using only data known to contain useful acoustic signal. Quiet periods outside of the time when an acoustic illumination signal is present are not recorded and hence do not contribute to the averaged signal. This method also allows for a significant reduction in the amount of data that needs to be collected since the period of acoustic illumination represents only a fraction of the recording time when compared to continuous data logging.

Figure 5:
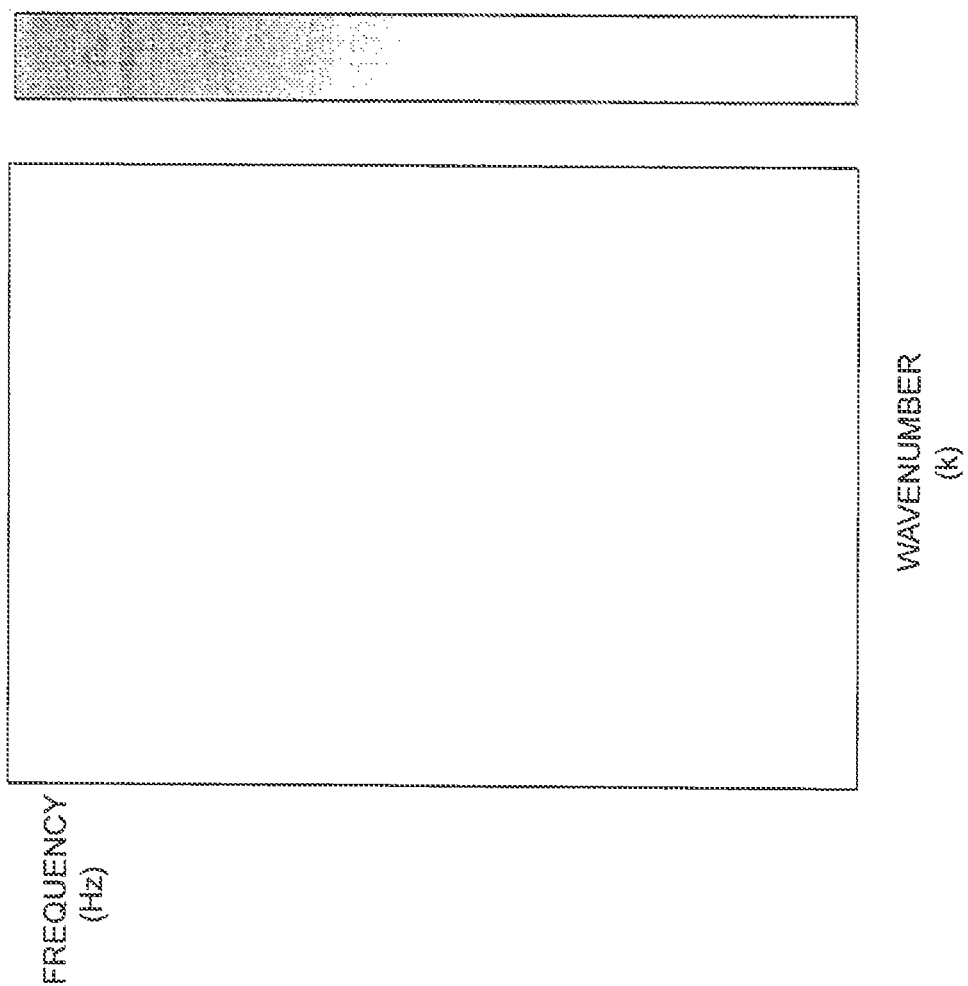
FIGS. 5 to 7 are drawings of example kω plots taken at different times in the same well subject to acoustic illumination (which occurs in FIG. 6)
Figure 6:
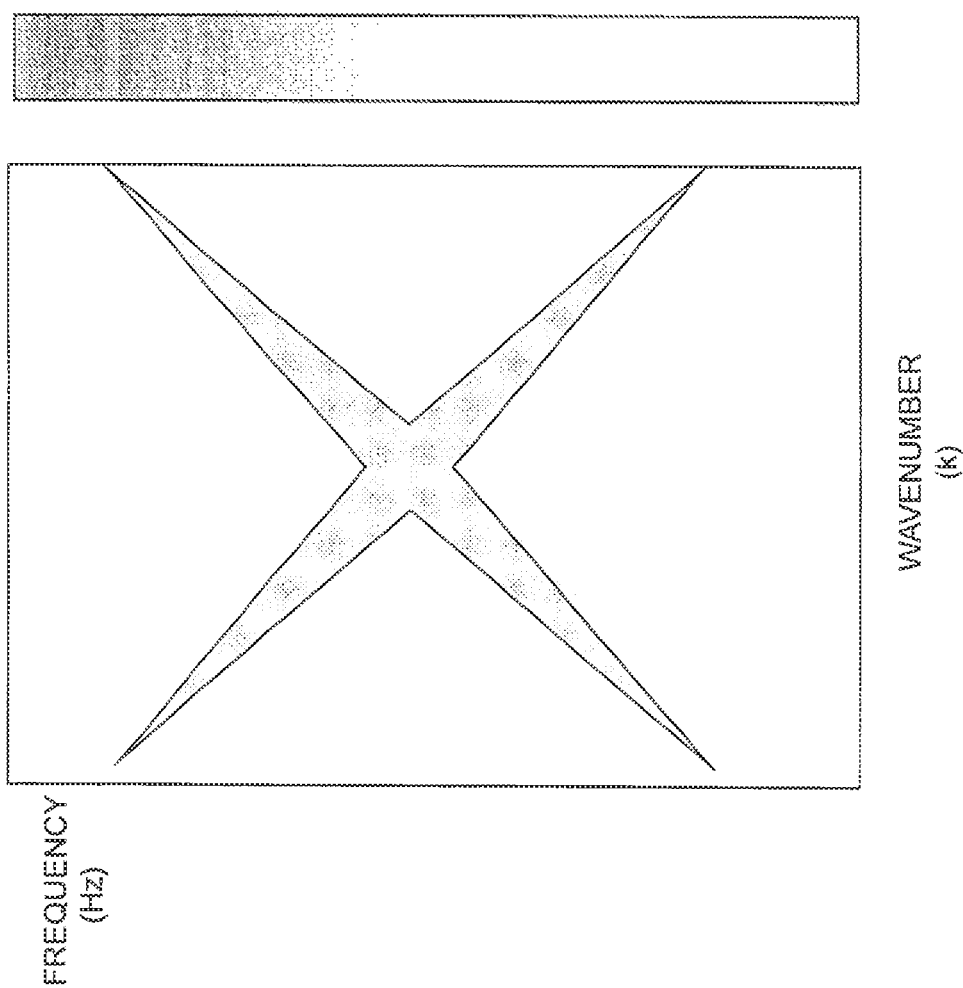
Figure 7:
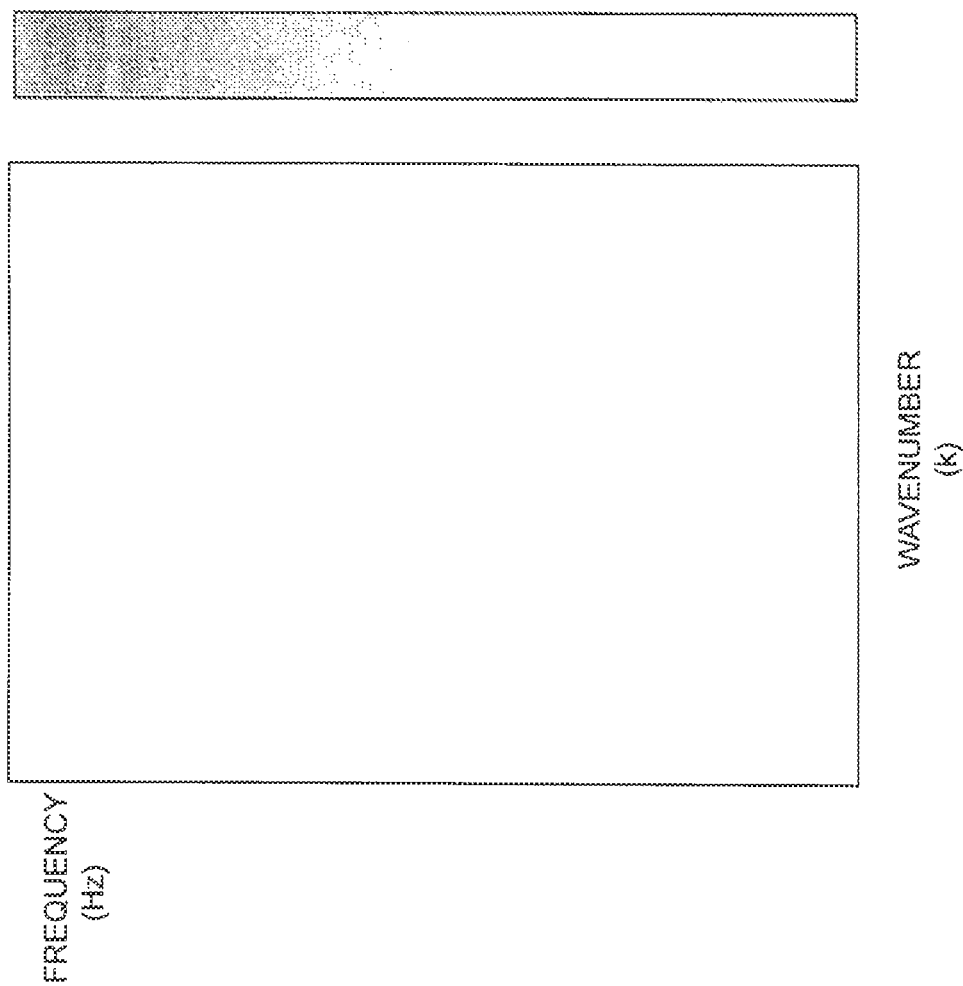

For this to be done effectively it is necessary to synchronize the acoustic source generation with the recording made by the DAS. In embodiments of the invention this can be done in two ways. The first method uses an accurately timed trigger signal to initiate the acoustic source and the DAS data recording at the same time. Depending on the position of the acoustic source used to provide the illumination relative to the borehole, delays can be built into the recording start time to allow for the travel time of the acoustic waves to the borehole or a specific region of the borehole. For each source firing a short recording is made and the flow speed calculated, in between source firings data does not need to be collected. The second method fires the source at regular intervals synchronized to an accurate clock signal such as GPS time. The DAS, which must also be synchronized to the same clock, records at the same intervals or offset by a certain amount of time to allow for travel time of the acoustic illumination source signal Results of Acoustic Illumination Example results showing fluid flows provided by an embodiment of the invention using acoustic illumination are shown in FIGS. 5 to 7, which show k-ω plots for a number of discrete times during an experiment. In this experiment, an otherwise quiet pipe with fluid flowing therein pipe was struck with a hammer to provide an acoustic impulse. When k-ω plots are made in the absence of any acoustic illumination (as shown in FIGS. 5, and 7), the speed of sound cannot be seen. However, when k-ω plots are made during time periods coincident with the impulse (corresponding to FIG. 6), the speeds of sound corresponding to the various media within the pipe cross-section can be seen. As described above, these speeds of sound can be used to derive (1) the flow speed (2) information concerning the nature of the fluid and (3) well integrity data.

As noted, FIGS. 5 to 7 show k-ω results are shown for a cement-lined pipe with a dense acoustic sensor array embedded within the array.

| FIG. NO. | Time period | Condition | Summary of kω plot |
|---|---|---|---|
| 5 | 0 s-0.15 | Silence | No speeds visible |
| 6 | 0.20 s-0.35 s | Impulse introduced by hammer on pipe exterior | Waveguide characteristics including fluid sound speed clearly visible |
| 7 | 0.40 s-0.55 s | Silence | No speeds visible |

In summary, therefore, some embodiments of the present invention provide for the deliberate incidence of an actively generated acoustic wave onto a fluid flow carrying structure simultaneous with data logging being undertaken by a DAS that monitors the structure. The incident acoustic energy couples into the fluid flow carrying structure and effectively acoustically propagates along the fluid, allowing speed of sound in the fluid to be determined, from which fluid flow speed can then be determined. Many different sound sources either within or without the fluid flow carrying structure may be used, such as seismic sources, or flow driven devices.

Well Adaptation for Acoustic Illumination

Figure 12:
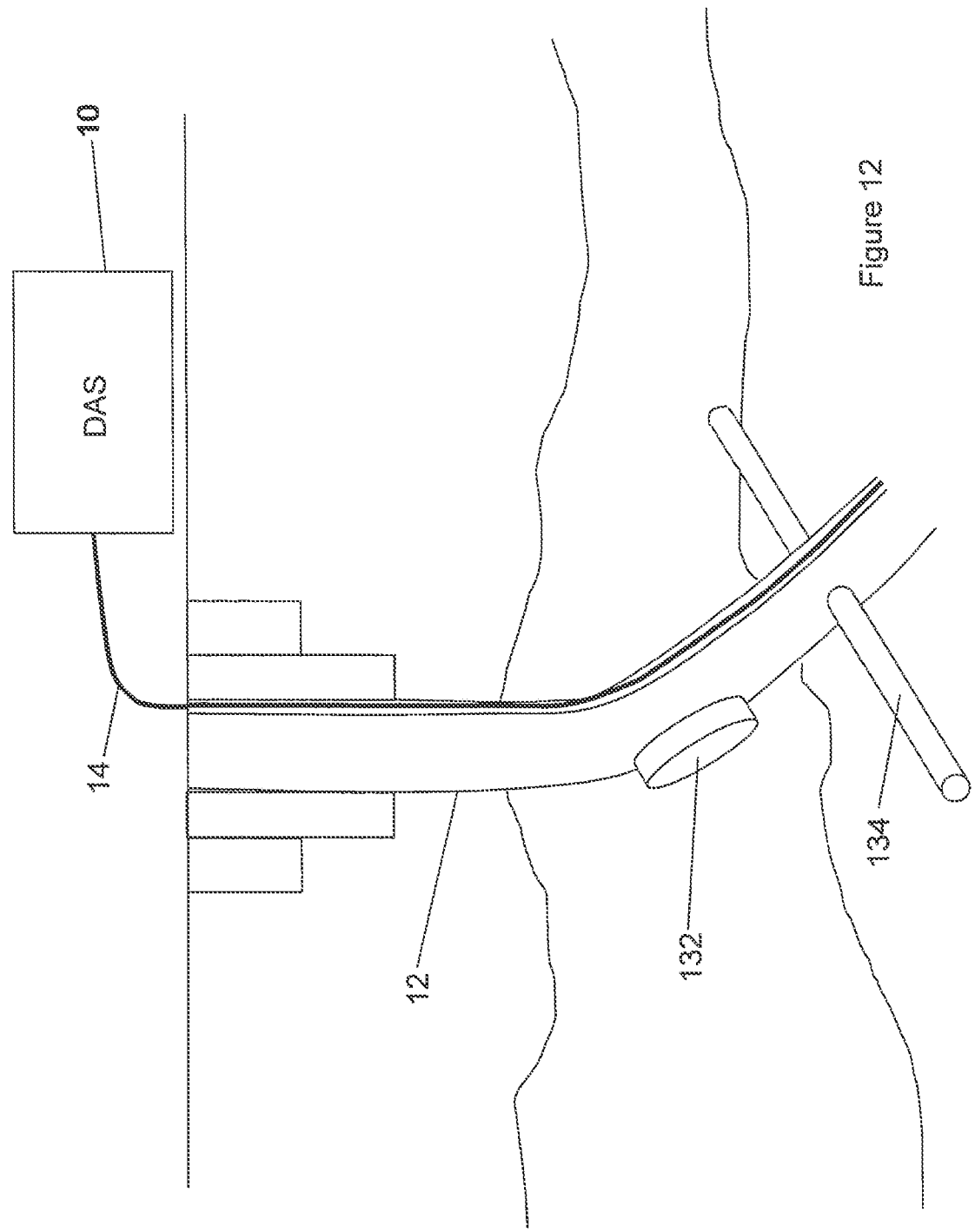
FIG. 12 is a drawing illustrating possible modifications to be made to casing of a well to allow the well to be more acoustically coupled to the surroundings.
Figure 13:
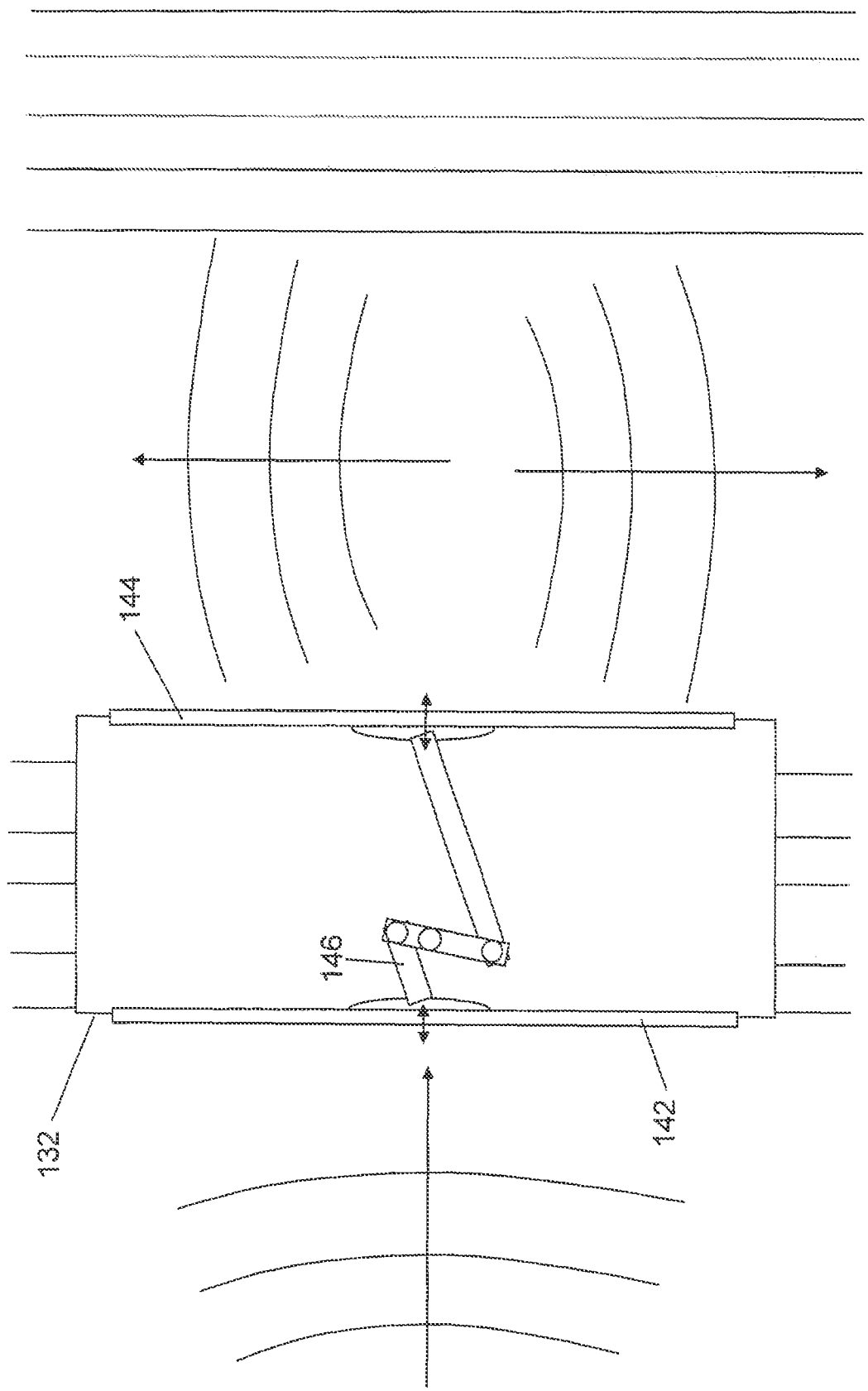
FIG. 13 is a drawing illustrating one of the modifications of FIG. 12 in more detail.
Figure 14:
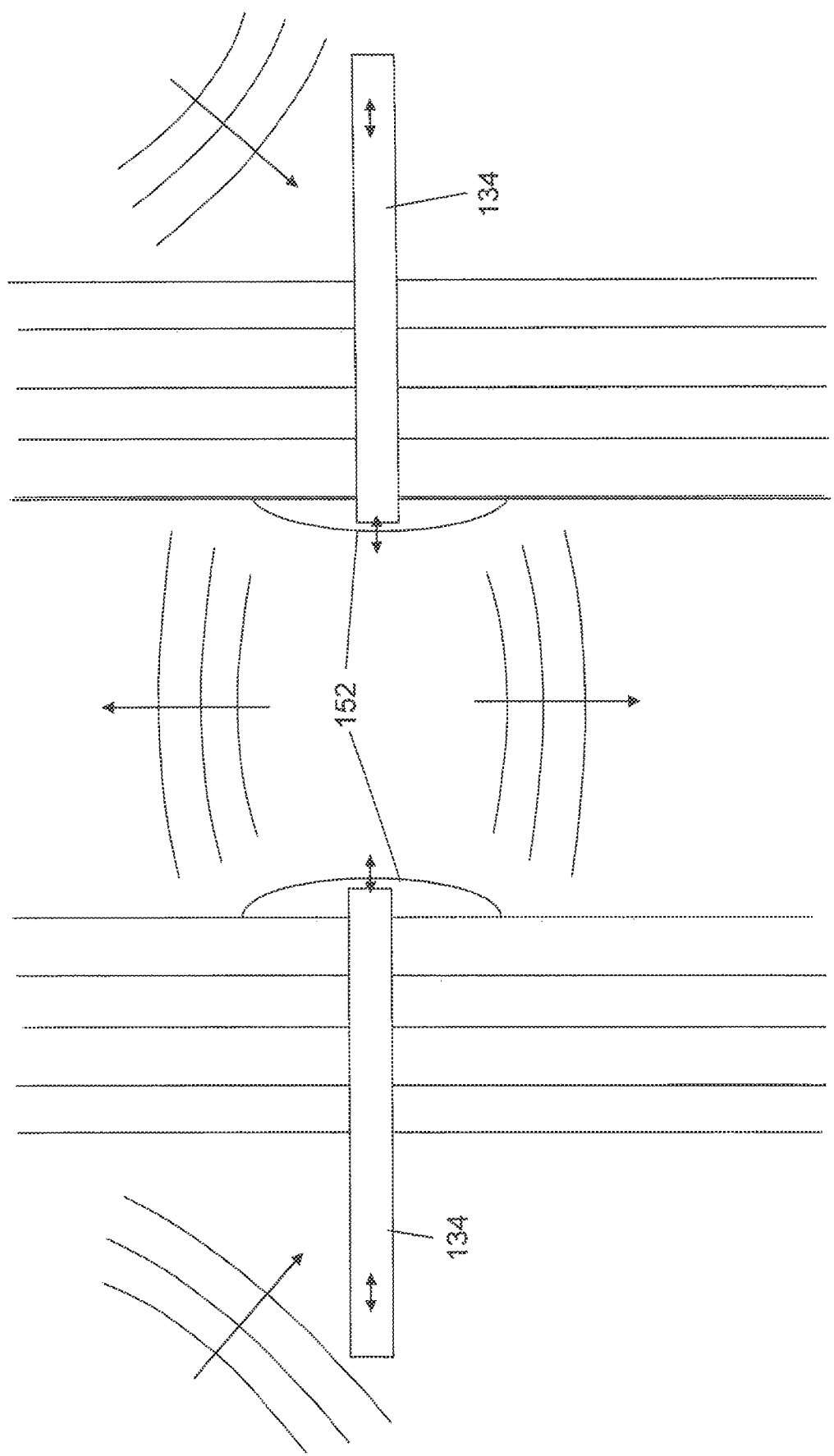
FIG. 14 is a drawing illustrating another of the modifications of FIG. 12 in more detail.

Some further embodiments of the present invention relate to the adaptation of the fluid flow carrying structure itself so as to enhance its ability to couple into its interior acoustic energy incident from the outside. In this respect external acoustic illumination of the interior of the structure can be enhanced by coupling into the structure more of the incident energy. Thus, for example, in the case of an oil or gas well the outer casing of the well may be adapted by the provision of an acoustic coupling mechanism arranged to couple into the interior of the well acoustic energy incident externally. FIGS. 12 to 14 illustrate specific examples.

As shown in FIG. 12, the outer casing of a well 12 may be provided with devices or other adaptations to improve the ability of the well to couple into its interior incident acoustic energy, that then travels along the well in waveguide mode, as described previously. In particular, one such mechanism is a drum type arrangement 132 which passes from the outside of the well through the outer cement and casing, into the interior, and which operates similar to an ear drum to transmit acoustic energy. FIG. 13 illustrates the arrangement in further detail.

More specifically, in FIG. 13 an acoustic transmission drum 132 is shown, wherein the drum extends in this case through (in order from outside in the direction inwards) the cement, casing, annulus, and tubing into the interior of the well. In other embodiments the drum may only extend through a subset of these layers, for example, may extend through the cement or casing into, but not through, the annulus, or through the tubing and annulus from the casing. In further embodiments individual drums 132 may be provided in the respective layers, or a subset of the layers of the well. For example, the tubing layer may be provided with a respective drum that passes therethrough, and the casing layer may be provided with a respective drum that passes therethrough. Others of the layers may also be provided with their own respective drums. In some embodiments, where one or more drums per layer are provided, the drums may preferably be in spatial alignment from layer to layer, such that acoustic energy may be passed from drum to drum.

An acoustic transmission drum 132 is shown in more detail in FIG. 13. The drum includes a first acoustically reactive surface 142, such as a membrane or the like, which is sensitive to incoming acoustic vibrations such that the vibrations are transferred into the membrane. A second acoustically reactive surface 144, which may also be a membrane, is mechanically coupled to the first surface such that any acoustic vibrations induced in the first surface are transferred to the second surface. In this respect, the mechanical coupling 146 may be arranged to amplify the acoustic vibrations transferred to the second surface, for example by using a linked arm arrangement with a pivot point arranged to provide a mechanical advantage. In particular, as shown in FIG. 13, a first arm attached at one end to the first surface 142 is pivotally attached to a linking arm. The linking arm is pivotally mounted about a fixed pivot point, and is pivotally attached at its other end to one end of a second arm. The second arm is attached at its other end to the second surface 144. The position of the fixed pivot can be set such that the acoustic vibrations transferred from first surface to the second surface are increased or decreased in amplitude.

Other transfer mechanisms may be used. For example, a straight-arm linkage (i.e. without the pivots) may be made between the two surfaces, so that vibrations in the first surface are directly transferred to the second surface. Such a linkage may simply comprise a connecting rod connecting the inner surfaces of the two surfaces.

In the embodiment of FIG. 13, the outer face of second surface 144 is located within the main body of the well, in direct contact with any fluid flowing therethrough. Therefore, acoustic vibrations can be transferred directly into the fluid, to then propagate up and down the fluid carrying structure, as described previously, and as shown.

The operation of the arrangement is as follows. External acoustic vibrations incident on the first surface are transferred to the first surface, and then, via the linkage mechanism, to the second surface. The acoustic vibration of the second surface is then coupled into the fluid in the structure, and propagates up and down the structure as if the structure were a waveguide, as described previously.

A second acoustic coupling mechanism is shown in FIGS. 12 and 14. This mechanism comprises rods 134 which extend from the casing through the cement layer and into the surrounding rock strata. On FIG. 12 the rods are not shown to scale, and as an example may be a few (2-3) to several (20-30) centimetres in length, although other lengths may be used. As shown in FIG. 14, the rods are coupled through the cement, casing, annulus and tubing into the well interior, and are provided on their inner ends with vibration surfaces 152 to transmit any acoustic vibrations in the rods into the fluid in the well. The rods may be firmly mounted such that they cannot move, or alternatively may be slightly sprung mounted (not shown), such that they are able to move in and out in their elongate direction, as shown in FIG. 14.

The operation of the arrangement of FIG. 14 is as follows. External acoustic vibrations in the surrounding rock strata and incident on the rods are transferred to the through the rods into the interior of the structure, and via the vibration surfaces into the fluid flowing therethrough. The acoustic vibration of vibration surfaces is coupled into the fluid in the structure, and propagates up and down the structure as if the structure were a waveguide, as described previously.

In variations of the embodiment of FIG. 14, the rods may only extend through some of the outer layers, such as the cement layer and the casing for example, but not through all of the outer layers.

The above described arrangements therefore describe how fluid flow measurements, including speed of sound measurements from which material identification may be made, may be obtained along a well using a DAS, either in the case of a noisy well where there is plenty of sound energy to detect, or for quiet wells where internal or external acoustic illumination may be used. In view of these techniques, we next describe embodiments of the invention where the fluid flow data is correlated with, or otherwise associated, combined, or used with seismic data to more accurately map the location of underground reservoirs.

Correlating or Combining Flow Information with Seismic Information

Figure 15:
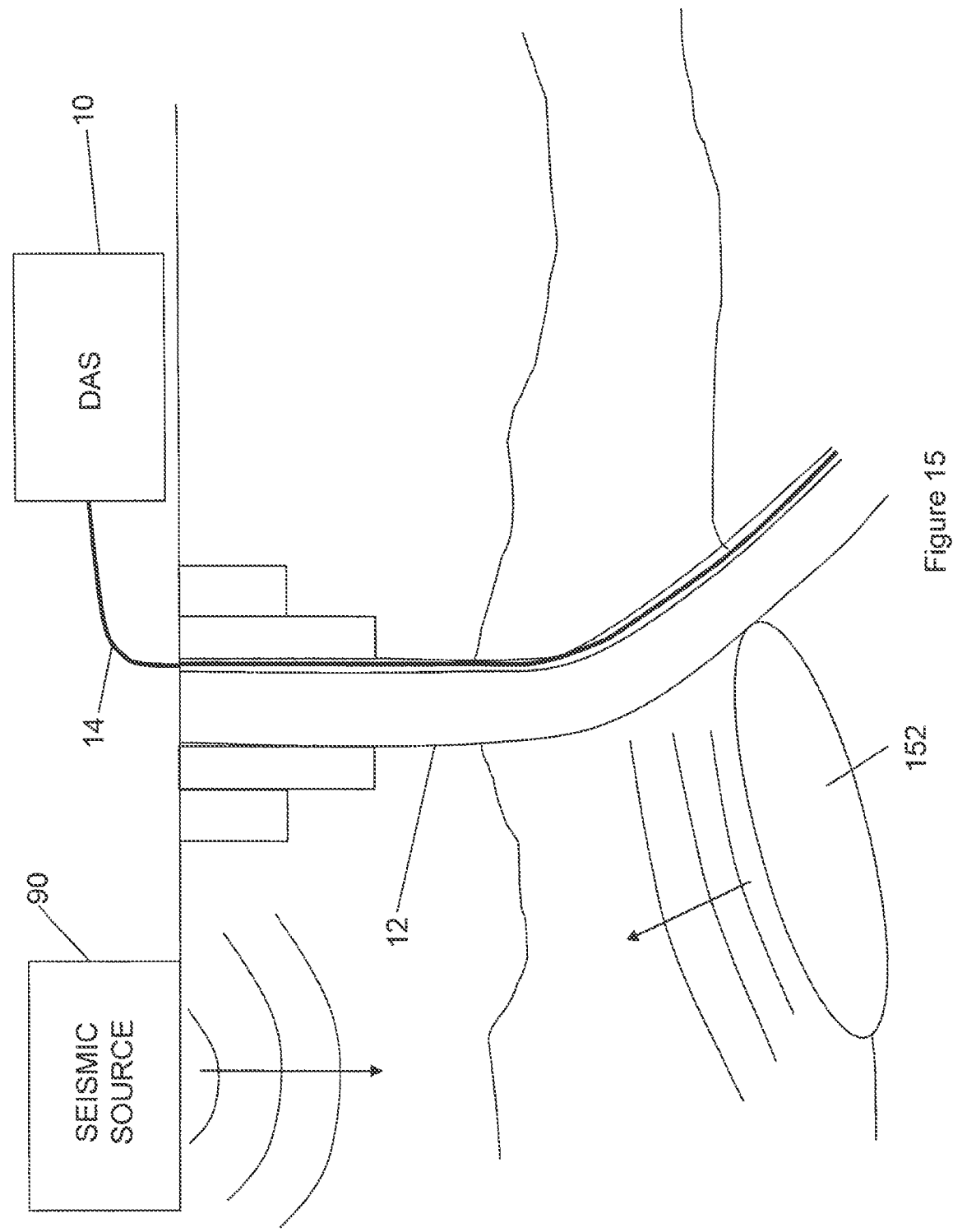
FIG. 15 is a drawing illustrating how seismic data may be used in combination with flow data to identify petroleum reservoir locations.

FIG. 15 illustrates a typical scenario where embodiments of the present invention which combine DAS based flow and speed of sound measurements with seismic data. In FIG. 15 a conventional seismic survey of the area of the well or borehole 12 is undertaken by seismic source 90 and seismic detectors (not shown). The seismic survey depends on changes in acoustic impedance to provide reflections and refractions from rock strata of different types, and from underground reservoirs, as is known in the art. The seismic survey should therefore be able to detect underground petroleum reservoir 152 from the acoustic signal reflected back therefrom, and from identification of typical oil bearing rock formations in the vicinity of the reservoir. As noted previously, the spatial resolution of a 3D seismic survey can be as high as 12 m, but may typically be lower than this, in some cases in the range 25 to 200 m, depending on acoustic conditions.

Thus, whilst seismic surveys can reliably detect the presence of reservoirs, precise mapping of their size and extent is still dependent on the imaging resolution of the seismic survey equipment. In order to improve this, and in particular where test or production wells have already been drilled, embodiments of the invention make use of the flow data that is obtainable via DAS 10 as described previously to improve the accuracy of the location or extent of the reservoir. Specifically, the flow profile data available via the DAS can tell the well operator where in the production zone of the well flow is actually occurring i.e. into which part of the perforated zone of the well fluid is actually flowing, substantially at the resolution of the DAS. Therefore, the flow data helps to pinpoint at much higher resolutions where flow from the reservoir actually occurs. If the well intersects the reservoir such that flow into the well occurs at the points along the intersection, then the intersect length can be determined, which may indicate the depth of the reservoir at the intersection point.

Figure 16:
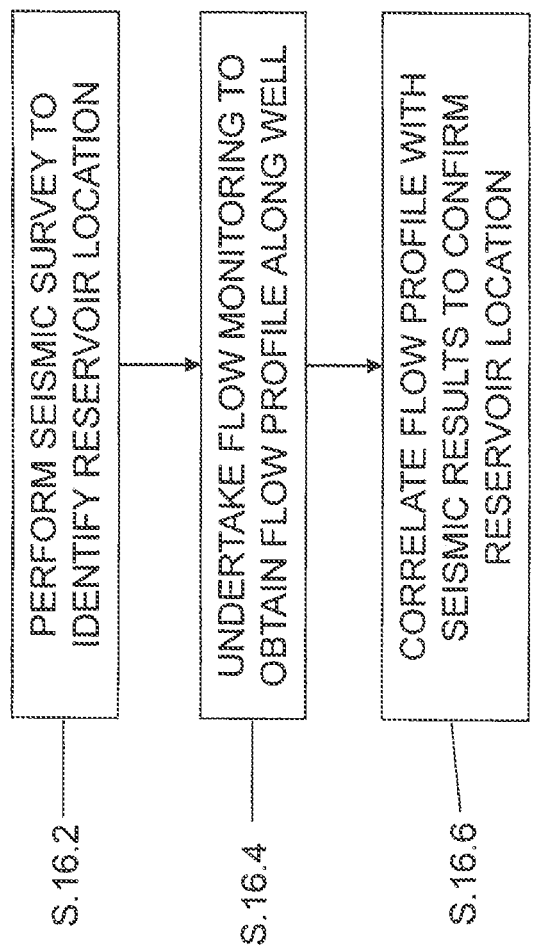
FIG. 16 is flow diagram illustrating the steps involved in the operation of the embodiment of FIG. 15.

FIG. 16 illustrates the process in more detail. Firstly, at step 16.2 a seismic survey is undertaken to identify the location of the reservoir 152. Then, at s. 16.4 flow monitoring is undertaken using the DAS based techniques described above to obtain fluid flow data along the well. Where the well is quiet, acoustic illumination techniques may be used, as described. Conveniently, the acoustic illumination may be the acoustic energy from the seismic survey, such that the seismic survey and the flow monitoring takes place at the same time.

Once the flow data has been obtained and the seismic survey results obtained, at s.16.6 the two sets of data are correlated with each other, or otherwise combined, associated, or used together, to help improve knowledge of the characteristics of the reservoir, for example such as the size, depth, extent, and volume of the reservoir, as well as other characteristics such as the pressure and resultant flow speed obtainable. In this respect, because the DAS has higher resolution than the seismic survey system, use of the DAS based data should help to improve the accuracy of the findings from the seismic system.

Using DAS During EOR

Figure 17:
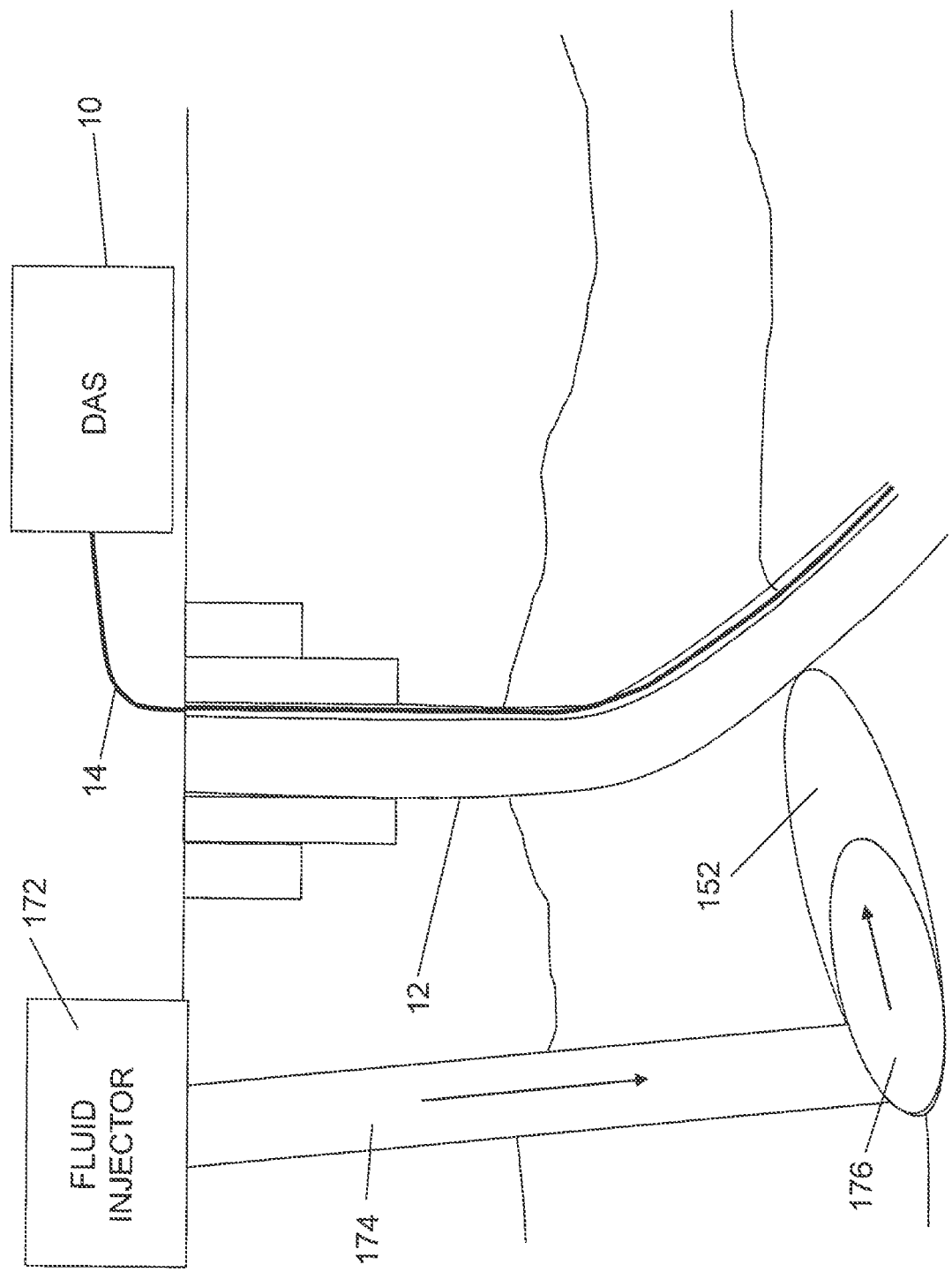
FIGS. 17 and 18 are drawings illustrating a typical water injection EOR process.
Figure 18:
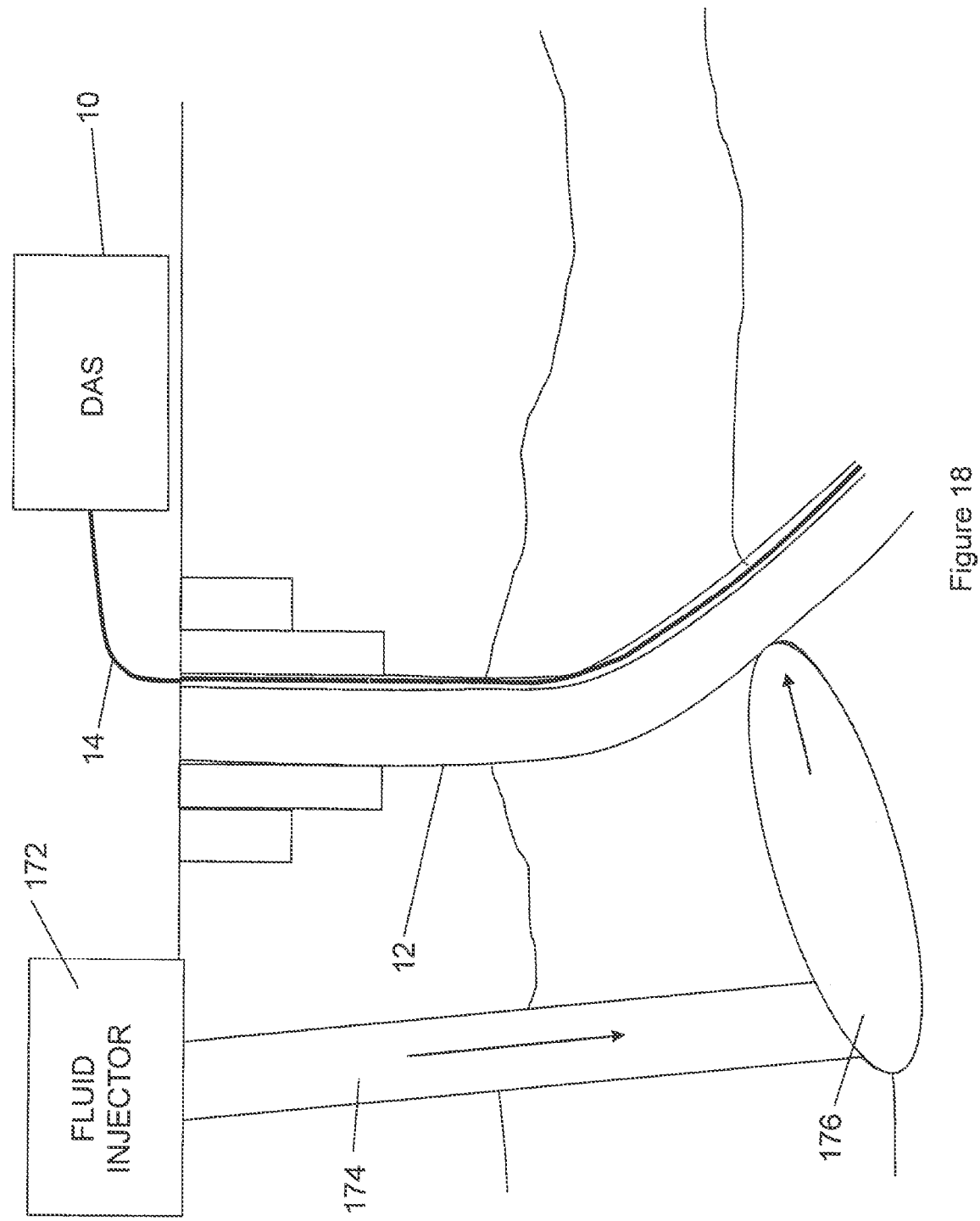

In a further embodiment, the DAS based measurement system may also be used during Enhanced Oil Recovery (EOR) procedures such as water injection, hydraulic fracturing, steam assisted gravity drainage (SAGD), cyclic steam stimulation (CSS) or high pressure CSS (HPCSS). In a water injection procedure, shown in FIGS. 17 and 18, a water injector is used to inject water down an injection well 174 into an oil reservoir 152 so as to help to force the oil 152 towards the production well 12, and out of the well 12. Such water injection EOR techniques are often used in aging wells where the production pressure is failing, and help to improve oil recovery from the reservoir. Water injection can take a significant amount of time, for example several years, as the injected water migrates along the reservoir, forcing the oil towards the production well. Eventually, all the recoverable oil from the well will have been obtained, and the well will start to produce a greater percentage of water, as shown in FIG. 18.

Figure 19:
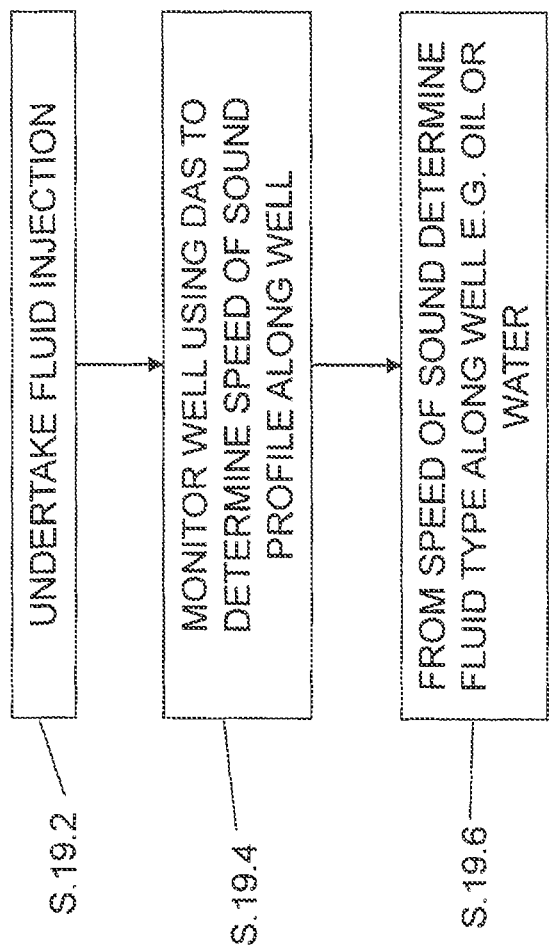
FIG. 19 is a flow diagram illustrating the steps involved in using a DAS to aid EOR water injection processes.

The DAS based monitoring system of the present embodiments can help in this situation due to its ability to distinguish between oil and water based on speed of sound measurements. In particular, as shown in FIG. 19, during a water injection process of s. 19.2 the well is monitored by the DAS to determine the speed of sound at profile along the well, using the space-time and k-ω techniques described previously. From the speed of sound profile it is then possible to determine what liquid is actually present at each point along the well, and particularly whether it is oil or water. By obtaining such information along the perforated production zone of the well, it becomes possible to more accurately map where oil is still being produced, and where water is being received instead. Thus, it may be possible to more accurately control the water injection to enhance the oil producing regions of the perforated production zone.

Likewise in hydraulic fracturing (fracking), where fluid is pumped into a well at pressure to fracture the surrounding rock strata to aid in oil flow, it can be helpful to be able to discriminate along the perforated production zone of a well where oil is being received, or where fracking fluids are entering the well. The ability of the DAS to determine speed of sound profiles along a well using the techniques described above allows discrimination between oil and fracking fluids to be made, in the same manner as with the oil and water discrimination above.

Within steam assisted gravity drainage (SAGD) two wells are created one above the other, and heated steam injected into the upper well to help create a heated steam chamber in the rock and tar deposits. The heat from the steam chamber lowers the viscosity of heavy crude oil and bitumen in the rock, allowing it to sink through the steam chamber and into the lower well for collection. Again, the ability of the DAS to discriminate material types via speed of sound measurements over an area can help to map the extent of the steam chamber, and where heavy crude and bitumen is flowing into the lower well.

In cyclic steam stimulation and high pressure cyclic steam stimulation a single well is used, and the process cycles between forming a steam chamber around the well injection of heated steam, and then collection of the lowered viscosity heavy crude and bitumen deposits via the same well. The DAS can help to map the extent to which petroleum products such as the heavy crude and bitumen are flowing into the well along its length, during the production phase.

Various modifications may be made to the above described embodiments to provide further embodiments, any and all of which are intended to be encompassed by the appended claims.

There follows a set of numbered features describing particular embodiments of the invention. Where a feature refers to another numbered feature then those features may be considered in combination.

1. A method for enhancing seismic survey results, comprising:
   receiving seismic data from a seismic survey of an area provided with a well or borehole arranged to tap an underground reservoir;
   monitoring the well or borehole with a distributed acoustic sensor (DAS);
   determining the fluid flow from the reservoir along one or more parts of the well or borehole using acoustic measurements obtained by the DAS; and
   combining, for example by correlation, association or other use, the determined fluid flow data with the seismic data to improve the confidence or accuracy of determined characteristics of the underground reservoir.

2. A method according to feature 1, wherein the characteristics include one or more of the size, depth, extent, volume, and/or pressure of the reservoir.

3. A method according to feature 1, and further comprising acoustically illuminating the well or borehole with a controllable sound source.

4. A method for hydrocarbons recovery, comprising:
   undertaking fluid injection into an underground hydrocarbons reservoir provided with a production well or borehole; and
   monitoring the production well or borehole with a distributed acoustic sensor (DAS) to determine the type of fluid that is being received at one or more parts of the well or borehole.

5. A method according to feature 4, wherein the monitoring comprises determining the speed of sound in received fluid at one or more parts of the well to thereby determine the type of fluid.

6. A method according to feature 4, and further comprising acoustically illuminating the well or borehole with a controllable sound source.

7. A method according to feature 4 wherein the injected fluid is any of water, hydraulic fracturing fluid, or steam.

8. A method according to feature, wherein the fluid received at one or more parts of the well is recovered hydrocarbons, or injected fluid, depending on location in the well.

9. A method according to feature 4, wherein the fluid injection further comprises water injection.

10. A method according to feature 4, wherein the fluid injection further comprises hydraulic fracturing.

11. A method according to feature 4, wherein the fluid injection further comprises steam assisted gravity drainage (SAGD).

12. A method according to feature 4, wherein the fluid injection further comprises cyclic steam stimulation (CSS) or high pressure CSS (HPCSS).

The invention claimed is:

1. A method for monitoring hydrocarbons recovery, comprising:
   undertaking fluid injection into an underground hydrocarbons reservoir provided with a production well or borehole;
   acoustically illuminating the production well or borehole with a controllable acoustic source, the controllable acoustic source being at a known location relative to the production well or borehole; and
   monitoring the production well or borehole with a distributed acoustic sensor (DAS) comprising an optical sensing fibre to determine the type of fluid that is being received at one or more parts of the production well or borehole, wherein the monitoring comprises applying a two-dimensional Fourier transform to acoustic measurements taken from along the length of the optical sensing fibre to obtain a space wavenumber-frequency (k-ω) plot, wherein the monitoring by the DAS is synchronised with the acoustic illumination by the acoustic source such that the DAS is arranged to obtain acoustic measurements from along the length of the optical sensing fibre during periods of acoustic illumination and to stop obtaining acoustic measurements during quiet periods, such that the acoustic measurements obtained during a period of acoustic illumination provide an averaged signal with an improved signal to noise ratio, and wherein synchronising the acoustic illumination by the acoustic source and the monitoring by the DAS comprises:

triggering the acoustic source to generate an acoustic wave;

waiting a pre-determined period of time based on a travel time of the acoustic wave from the known location of the acoustic source to the production well or borehole after the pre-determined period of time has elapsed, activating the monitoring by the DAS to begin collecting acoustic measurements from along the length of the optical sensing fiber when the generated acoustic wave is incident on the production well or borehole; and deactivating the DAS to stop collecting acoustic measurements once the generated acoustic wave has been coupled into the production well or borehole and propagated therealong.

2. A method according to claim 1, wherein the monitoring comprises determining the speed of sound in received fluid at one or more parts of the production well in dependence on the acoustic measurements taken from along the length of the optical sensing fibre by the DAS to thereby determine the type of the received fluid.

3. A method according to claim 1, wherein the injected fluid is any of water, hydraulic fracturing fluid, or steam.

4. A method according to claim 1, wherein the fluid received at one or more parts of the production well is recovered hydrocarbons, or injected fluid, depending on location in the production well.

5. A method according to claim 1, wherein the fluid injection further comprises water injection.

6. A method according to claim 1, wherein the fluid injection further comprises hydraulic fracturing.

7. A method according to claim 1, wherein the fluid injection further comprises steam assisted gravity drainage (SAGD).

8. A method according to claim 1, wherein the fluid injection further comprises cyclic steam stimulation (CSS) or high pressure CSS (HPCSS).

* * * * *